(12) United States Patent
Chang

(10) Patent No.: US 9,608,756 B2
(45) Date of Patent: Mar. 28, 2017

(54) CONCURRENT AIRBORNE COMMUNICATION METHODS AND SYSTEMS

(71) Applicant: SPATIAL DIGITAL SYSTEMS, INC., Camarillo, CA (US)

(72) Inventor: Donald C. D. Chang, Thousand Oaks, CA (US)

(73) Assignee: Spatial Digital Systems, Inc., Agoura Hills, CA (US)

( * ) Notice: Subject to any disclaimer, the term of this patent is extended or adjusted under 35 U.S.C. 154(b) by 38 days.

(21) Appl. No.: 14/300,391

(22) Filed: Jun. 10, 2014

(65) Prior Publication Data

US 2014/0286235 A1 Sep. 25, 2014

Related U.S. Application Data

(63) Continuation of application No. 13/623,882, filed on Sep. 21, 2012, now Pat. No. 8,767,615.

(60) Provisional application No. 61/537,343, filed on Sep. 21, 2011.

(51) Int. Cl.
| | | |
|---|---|---|
| H04B 7/185 | (2006.01) | |
| H04J 14/02 | (2006.01) | |
| G01S 13/93 | (2006.01) | |
| H04L 25/03 | (2006.01) | |
| H04B 7/204 | (2006.01) | |
| B64C 39/02 | (2006.01) | |
| H04B 10/2581 | (2013.01) | |
| G01S 7/00 | (2006.01) | |

(52) U.S. Cl.
CPC ............ *H04J 14/02* (2013.01); *B64C 39/02* (2013.01); *G01S 13/9303* (2013.01); *H04B 7/18502* (2013.01); *H04B 7/18504* (2013.01); *H04B 7/2041* (2013.01); *H04B 10/2581* (2013.01); *H04L 25/03891* (2013.01); *G01S 7/006* (2013.01)

(58) Field of Classification Search
CPC combination set(s) only.
See application file for complete search history.

(56) References Cited

U.S. PATENT DOCUMENTS

| | | | |
|---|---|---|---|
| 4,152,647 A | 5/1979 | Gladden | |
| 5,909,460 A | 6/1999 | Dent | |
| 6,020,845 A | 2/2000 | Weinberg | |
| 6,756,937 B1 * | 6/2004 | Chang | H04B 7/18504 342/354 |
| 6,804,515 B1 | 10/2004 | McCraw | |
| 6,816,728 B2 | 11/2004 | Igloi | |
| 6,941,138 B1 | 9/2005 | Chang | |

(Continued)

OTHER PUBLICATIONS

Adriana Lee, Dude Guess Where I'm Calling From: Virgin Atlantic to Enable Mid-Air Cell Calls, May 18, 2012, http://www.technobuffalo.com/news/dude-guess-where-im-calling-from.

(Continued)

*Primary Examiner* — Frank Duong

(57) ABSTRACT

Aircrafts or unmanned air vehicles flying near Earth are used as airborne communications towers or relays. Using techniques of ground based beam forming and wavefront multiplexing enhance the ability to coherently combine the power of the communication signals, and improve the signal-to-noise ratio.

9 Claims, 12 Drawing Sheets

(56) References Cited

U.S. PATENT DOCUMENTS

| | | | |
|---|---|---|---|
| 6,968,187 B1 | 11/2005 | Irwin et al. | |
| 7,006,816 B2 | 2/2006 | Remy | |
| 7,187,949 B2* | 3/2007 | Chang | H01Q 1/246 |
| | | | 455/524 |
| 7,561,881 B2 | 7/2009 | Feher | |
| 7,715,838 B2 | 5/2010 | Swensen | |
| 7,751,779 B2* | 7/2010 | Ho | H04B 7/18515 |
| | | | 342/352 |
| 7,777,674 B1* | 8/2010 | Haddadin | H01Q 1/28 |
| | | | 342/368 |
| 7,835,734 B2 | 11/2010 | Eckert | |
| 8,050,696 B2 | 11/2011 | Buga | |
| 8,078,162 B2 | 12/2011 | Deaton | |
| 8,098,612 B2 | 1/2012 | Chang | |
| 8,111,646 B1 | 2/2012 | Chang | |
| 8,384,572 B2 | 2/2013 | Lin et al. | |
| 8,618,983 B2 | 12/2013 | Chen et al. | |
| 2005/0110681 A1 | 5/2005 | Londre | |
| 2007/0032246 A1 | 2/2007 | Feher | |
| 2007/0281705 A1 | 12/2007 | Bosenbecker | |
| 2008/0291864 A1 | 11/2008 | Chang | |
| 2009/0058635 A1 | 3/2009 | LaLonde | |
| 2011/0143768 A1 | 6/2011 | Lane | |
| 2011/0267241 A1 | 11/2011 | Grimm | |
| 2011/0273287 A1 | 11/2011 | LaLonde | |
| 2012/0022741 A1 | 1/2012 | Moore | |
| 2012/0051284 A1 | 3/2012 | Chang | |
| 2012/0140780 A1 | 6/2012 | Chang | |

OTHER PUBLICATIONS

Bryan Canter, GSM Applications for Airborne Platforms, Dec. 12, 2002, https://drachma.colorado.edu/dspace/bitstream/123456789/103/1/gsm+applications+for+airborne+platforms.pdf.

IEEE Journal of Solid-State Circuits, vol. 41, No. 12, Dec. 2006 "A 77-GHz Phased-Array Transceiver With On-Chip Antennas in Silicon: Transmitter and Local LO-Path Phase Shifting", Arun Natarajan.

Chao Lu, Student Member, IEEE, and Anh-Vu H. Pham, Senior Member, IEEE "A Multi-band CMOS Phased Array Transmitter Subsystem Module".

Dimitrios N. Loizos1,2, Paul P. Sotiriadis2 and Gert Cauwenberghs "High-Speed Adaptive RF Phased Array".

Dr. Shian U. Hwu 1, Kanishka Desilva2, and Catherine C. Sham3 "Spacecraft Multiple Array Communication System Performance Analysis".

teletopix.org Telecom Techniques Guide "How Many Various Gains brought by the MIMO for LTE" on Feb. 27, 2013.

* cited by examiner

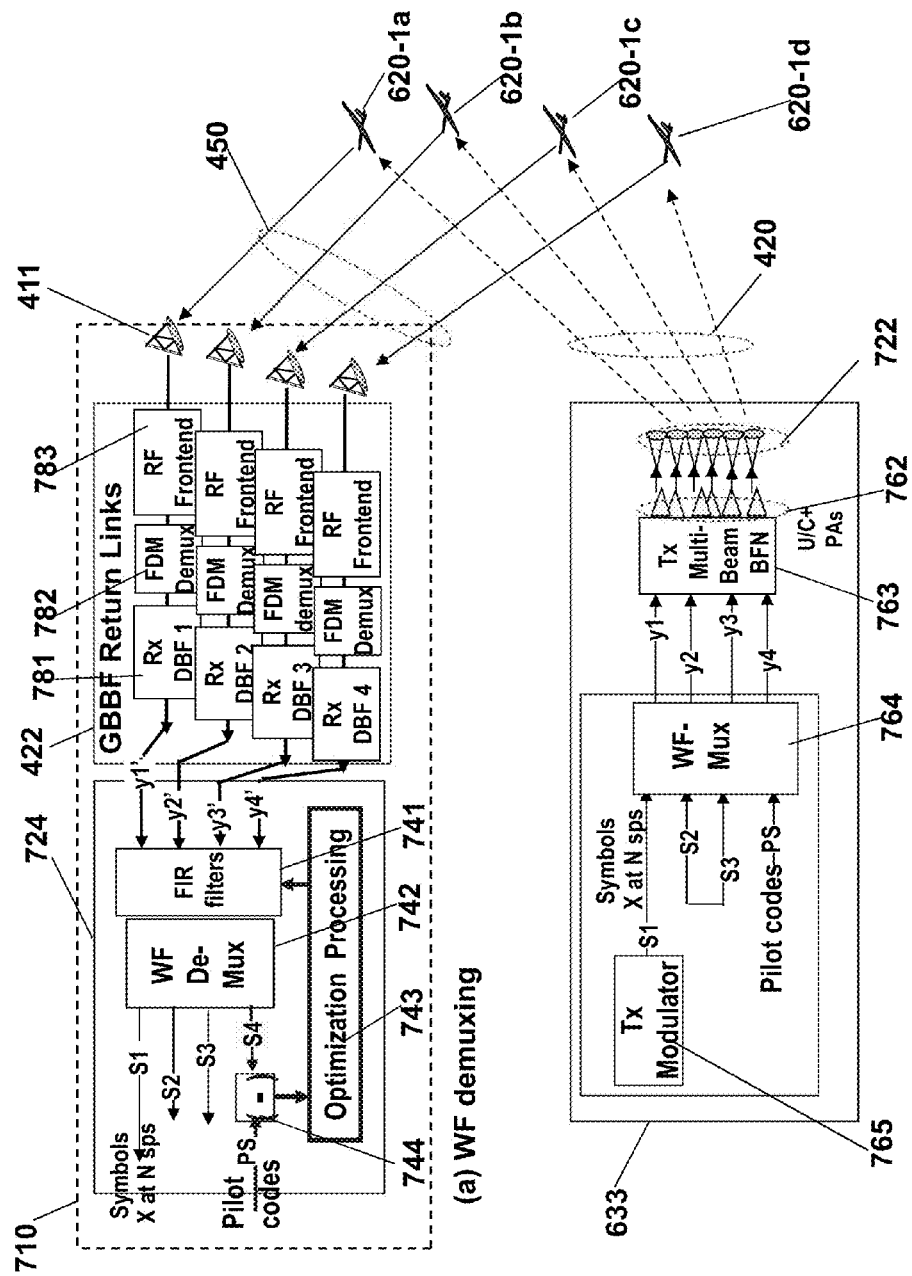

CONCURRENT AIRBORNE COMMUNICATION METHODS AND SYSTEMS

CROSS REFERENCE TO RELATED APPLICATION

This application is a continuation of application Ser. No. 13/623,882, filed Sep. 21, 2012, issued as U.S Pat. No. 8,767,615 B2 on Jul. 1, 2014, which claims the benefit of provisional application No. 61/537,343 filed Sep. 21, 2011.

TECHNICAL FIELD

This disclosure describes exemplary embodiments on the construction, operation and use of concurrent airborne communication methods and systems such as for troubled situations.

BACKGROUND

During emergencies, disasters, wartime, equipment failure or other troubled situations, the regular communications structures such as wireless cell phone towers, satellite dish, Internet, etc., may become damaged or suffer a power outage in one region, but still operate normally in another region. For example, if Louisiana has a hurricane and its communication infrastructure fails, Texas may still be fine and its communications equipment remains operable. It would be useful to utilize the working communications infrastructure (e.g. base stations and central hubs) in Texas to communicate with the victims and rescue workers in Louisiana. Unfortunately, direct wireless (e.g. near the line-of-sight) or other communication between the Louisiana victims and the Texas hubs may not be feasible because of the great distance, or because people do not have satellite-compatible phones. Thus, victims in Louisiana may be left with little communication mechanisms. Moreover, even in situations where there is no disaster, it is sometimes advantageous to utilize the communications infrastructure in other areas, for example, when there is a circuit overload in one major city, but not in other areas; or when there is equipment malfunction in one region, but not in another. Additionally, for military or missing person purposes, or in remote areas, where there are no existing stationary communication towers, it is beneficial to be able to use the infrastructure that exists in other areas. Therefore, it would be valuable to have methods, systems and apparatuses to address these and other problems.

DRAWINGS

The drawings depict exemplary embodiments and are not intended to be limiting in scope and may not depict objects to scale.

FIG. 7b depicts a block diagram of an embodiment of a return link that includes wavefront multiplexing.

DETAILED DESCRIPTION

This disclosure describes embodiments of roving communication towers, which comprise un-manned airborne vehicles ("UAV") carrying communication equipment that substitute for the role of wireless communication towers or cellular sites and WiFi or base stations that normally would have been operational in the local area ("foreground" area). Although the disclosure focuses on UAVs, manned airborne vehicles can also carry the equipment especially if a pilot wishes to have equipment that can operate on auto-pilot. In one embodiment, multiple UAVs act as roving communication nodes having equipment that operate concurrently with the communication devices (e.g. smartphones) in a foreground area and also with the still-operational communication and data networks in a background area (e.g. another city or state).

With respect to the foreground region, the UAVs communicate with the devices such as personal handsets and computers used by the victims or special communications equipment used by rescue workers in the foreground area. The UAVs have multi-beam arrays and electronics to simultaneously collect information and transmissions from many sources located in the foreground area, while rejecting noise and interference, to help as many victims as possible in as wide an area as possible. The UAVs have onboard beam forming or beam shaping techniques to strengthen communications with people in the foreground area. Alternatively, in the background region, the UAVs have equipment to communicate with (link to) hubs and networks and ground based beam forming facilities ("GBBF") located in the background area. Data transmission to either the foreground or the background can be computationally intensive, consuming much bandwidth, and power, which is simplified in one embodiment by using wavefront multiplexing techniques to perform the data packing and transmission to the ground hubs. Wavefront multiplexing ("WF MUX") cost effectively is utilized in some embodiments to perform system calibration or to transmit information securely. Or, together with beam forming techniques, WF MUX can also be used to enhance the signal over the noise or over interference. These and other techniques are used in various embodiments.

Figure 1:
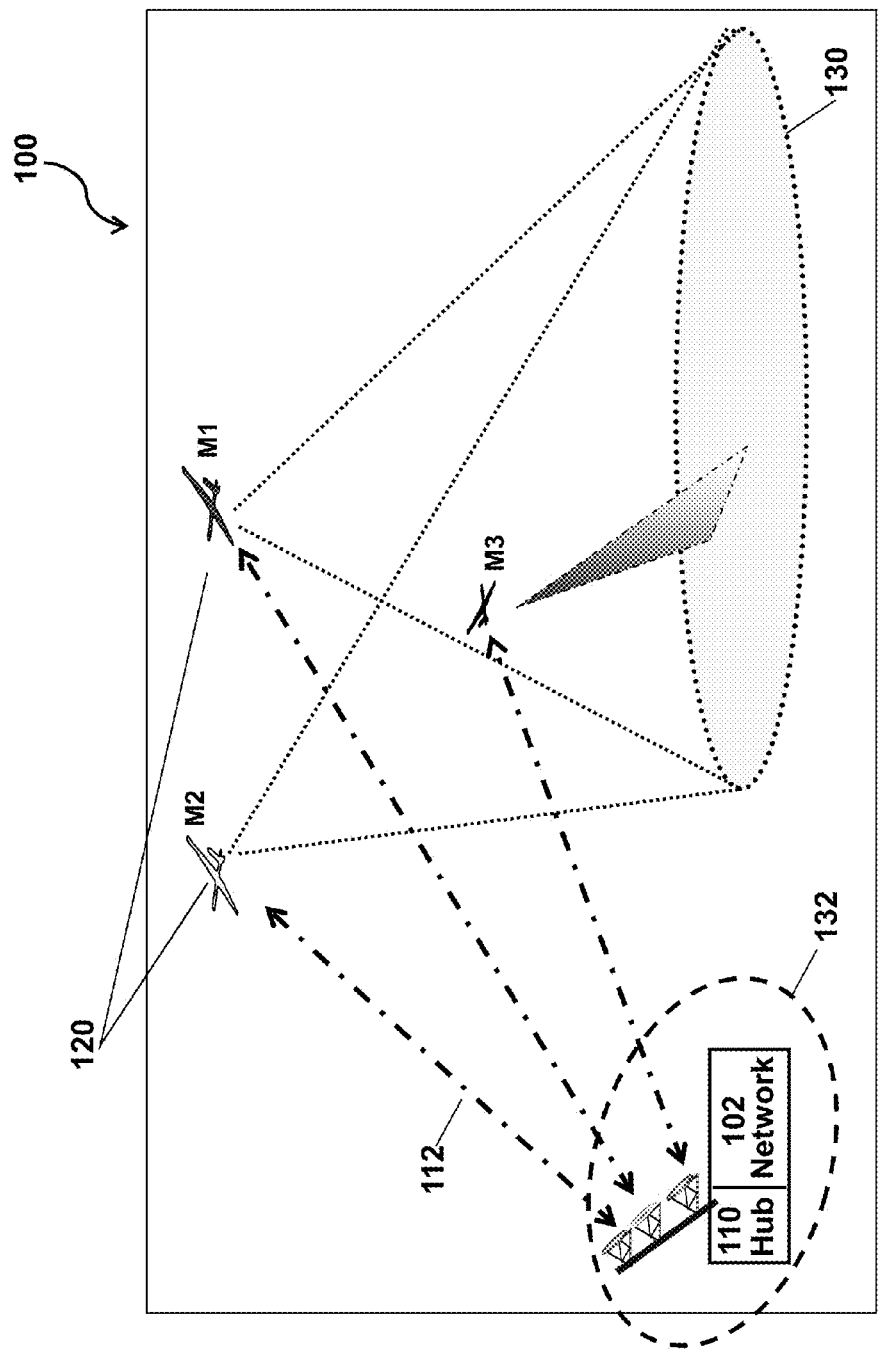
FIG. 1 depicts a communication architecture using airborne vehicles as communications towers.

FIG. 1 depicts an exemplary embodiment of the physical configuration of a communication architecture 100 that covers two geographic regions, the foreground area or region 130 (also "user segment") and the background area or region 132 (also "ground segment"). Air vehicles or UAVs 120 (also "airborne segment") are flying mostly over the foreground area 120; they are flying well below the altitude where they would enter an orbit of the Earth where they would constitute satellites. As such, the UAVs 120 are cost effective, readily fly up and down from and around the Earth like an airplane and do not have to be launched into an orbit. Although there can be any number of them, three aircrafts are illustrated, M1, M2, and M3. The proximity of the borders of the foreground area 130 and the background area 132 is in the range of approximately 0 to 1500 kilometers (Km), depending on the signal strength, the altitude at which the UAVs 120 fly, or environmental factors. The zero-kilometer refers to a scenario where the foreground 130 and background 132 are adjacent neighborhoods. The signal transmission strength is increased using WF MUX and beam forming techniques in various embodiments as described below.

In the embodiment of communication architecture 100 of FIG. 1, three UAVs 120 have equipment that performs three separate communication functions. Each UAV 120 carries different equipment, but the UAVs 120 operate concurrently and each subset of equipment serves different purposes or perhaps some redundant purposes in order to serve as a backup. Alternatively, the three separate functions are placed onto one large UAV, but in FIG. 1, three small UAVs 120 M1, M2, M3 are deployed. Presently, UAVs 120 can range in shape and size from a sphere of an inch in diameter to a huge airplane of many yards in length and width. In FIG. 1, M1, M2 and M3 are less than 5 ft in length and width and weigh less than 100 pounds even with the equipment they carry. Such smaller UAVs 120 are cost effective and consume less power, such as less than 200 Watts, which should allow them to remain in the air for at least twelve hours to provide continuous communication service in real time. In another embodiment, UAVs are decreased in size or have more features or consume less power.

In one embodiment, the equipment or payloads on the different UAVs 120 are different; the equipment on M1 enables networks for communications in public safety spectrum among members of rescue team; the equipment on M2 restores resident cell phone and/or fixed wireless communications at L or S band; and the equipment on M3 includes real time surveillance. For example, M1 carries the subset of electronic equipment for communications with or among rescue team members in the foreground area 130. The rescue workers may carry devices that operate in the emergency frequency bands and/or in the regular cellular frequency bands so that M1 communicates with the rescue team in a wide range of frequencies. M2 carries the subset of equipment that replaces the wireless cell towers or base-stations or IP networks for consumer and residential communications via their mobile phones or personal communications devices with WiFi, CDMA, GSM, DSL, fiber optics and so on. The equipment includes antenna arrays and transceivers. As such, M2 can communicate with the mobile phones and personal devices through the S or L frequency bands. Residents in the foreground 130 are thus provided with temporary communications via their own personal devices to the outside world through the equipment on M2. M3 carries imaging and surveillances equipment such as cameras, optical sensors, infrared or microwave sensors to capture images of the foreground area 130 in daylight or night. To reduce interference or to communicate with a more distant background area 132, UAVs 120 should fly above the terrestrial weather altitude such as over 5 Km above the foreground area 130.

In FIG. 1, M1, M2, M3 communicate through a wireless link 112 with a ground hub 110 located in the background area 132. The wireless link 112 is designated as the "background link 112." The communication frequencies used by M1, M2, M3 to the ground hub 110 are the same and are the Ku and/or Ka and/or S band or some other band that is perhaps backwards compatible with existing UAVs 120 or bands where the FCC has set lower auction fees. The wireless background links 112 between M1, M2, and M3 and the ground hub 110 have transmissions all in the same frequency, e.g., Ku and/or Ka or S bands.

In various embodiments, ground hub 110 comprises communications processing center in a building or truck. Ground hub 110 comprises computers or processors and external antennas, three of which are shown in FIG. 1. Some processing functions of ground hub 110 include telemetry, tracking, data transmission and reception, and control of the UAVs 120. In FIG. 1, ground hub 110 also has a gateway to terrestrial networks 102 that permit people to communicate with or to monitor the situation in the foreground area 130. For example terrestrial networks 102 comprise a telephone system, a local area network or Internet and computers to process images photographed by M3. As a result, people such as rescue works in a foreground area 130 will have access to real time imaging, and communications among co-workers and dispatching centers connected by the hub 110.

The embodiments of FIG. 1 and some of the other figures include at least three technologies (1) retro-directive array (2) ground based beam forming facilities, and (3) wavefront multiplexing and demultiplexing (WF MUX), all of which are described in more detail later, with a brief description given here:

Briefly, retro-directive antenna arrays (e.g. FIG. 8a, radiating element 1100) onboard the UAVs 120 transmit and receive data through the background links 112 and enable the UAVs 120 to communicate with the ground hubs 110 in the background area 132 more effectively, using less power, reaching hubs 110 that are farther away, or providing more data throughput. A retro-directive antenna array 1100 can transmit signals back in the same direction they came from, and in one embodiment, array 1100 comprises multiple antennas that detect signals from different directions, and selects the strongest signal.

Beam forming techniques control the radiation pattern, shape and direction of a signal affecting the directional reception sensitivity and/or transmission efficiency of antennas. For example, a signal may be encoded with information so that the signal is broadcasted based on a configurable shape in a selected direction. As a result, a more powerful signal or one with an improved signal over noise spectrum can be transmitted to an end-user. In the embodiment of FIG. 1, a GBBF facility is located in the background area 132 and it performs the computations and modulation, coding of the amplitude and phase of a signal. The signal and encoded information is transmitted to the UAVs 120 that then amplify and transmit the signal concurrently down to users or rescue workers located in the foreground area 130. The UAVs 120 have multiple on-board array elements to coherently radiate (transmit) the signal to the users and rescue workers. In this example, the UAVs 120 serve as a relay of the beam formed signals, and this transmission scenario without on-board beam-forming algorithms and/or electronics is sometimes referred to as "remote beam forming." By not having the beam forming electronics on the UAVs 120 reduces the size, weight and power consumption of a UAV 120.

The third technology, WF MUX, serves multiple purposes in different operational scenarios. For example, WF MUX aid calibrating the electronics and the background links 112 between a hub 110 and the UAVs 120. In the ground hub 110 receivers, WF MUX methods also play a role in coherently combining the signal power from different UAVs 120 so that the ground hub 110 receives a stronger signal. WF MUX also serves to generate secure data transmission if different UAVs 120 or different channels on one UAV 120 are utilized concurrently.

In another embodiment, the techniques described herein combined or nested by modifying the configuration depicted in FIG. 1. For example, it is possible extend the signal distance range from the UAVs 120 to a background region 132 such as from Louisiana to New Mexico, instead of merely Louisiana to Texas—by adding additional relays. There is a network of airborne flying vehicles. Instead of a direct link connection (background link 112) between the UAVs 120 and ground hub 110, one set of UAVs 120 act as relays and transmits to another set of UAVs 120 that then links to a ground hub 110. These networks of relays may be airborne, ground based, and/or satellite based. In this manner a background region 132 and a foreground region 130 is linked together even if they are very far apart.

Figure 2:
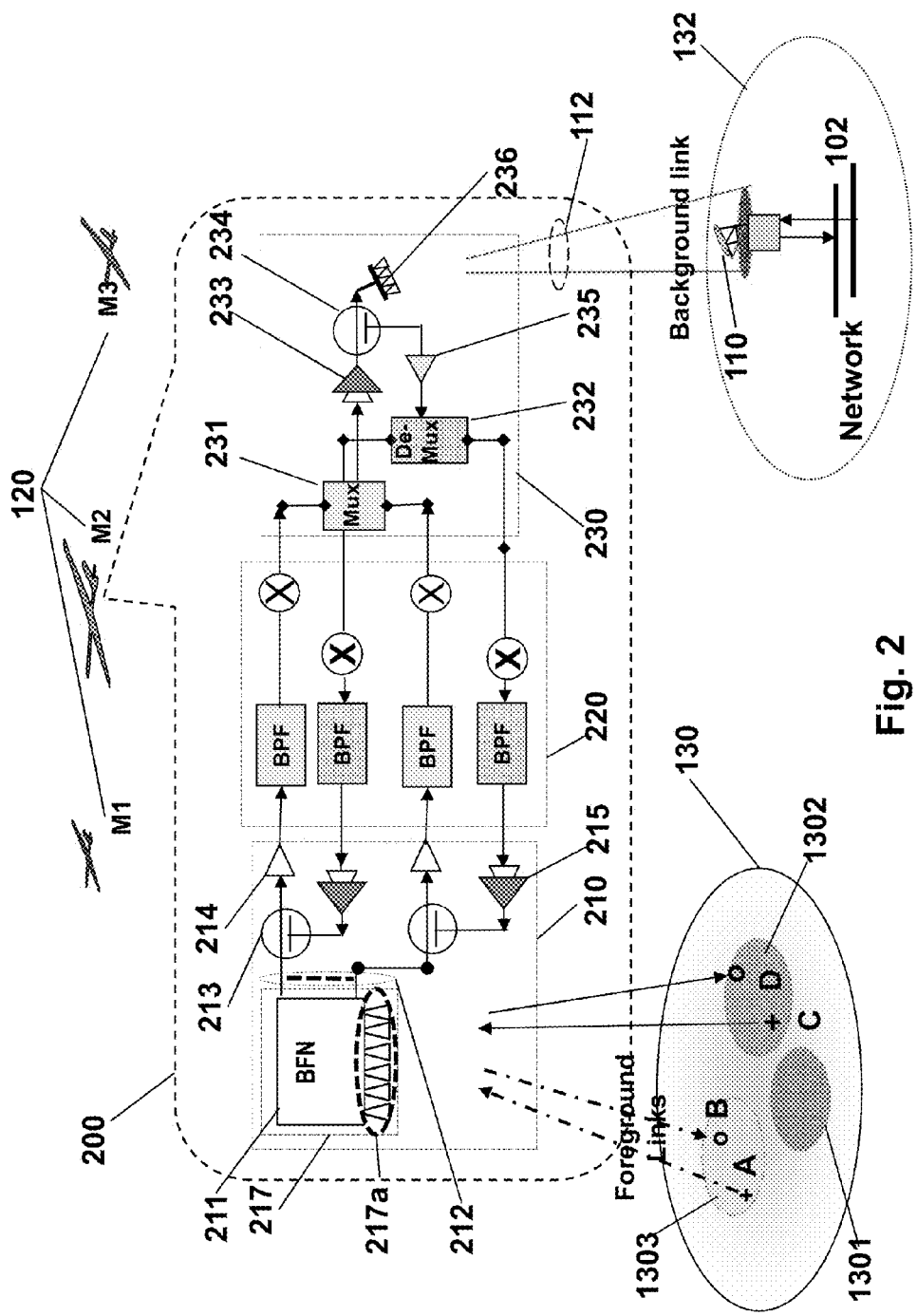
FIG. 2 depicts a block diagram of communications equipment onboard one aircraft.

FIG. 2 depicts an exemplary embodiment of the communications equipment 200 onboard an aircraft or UAV such as M2 to relay communications to and from users A, B, C, D (e.g. victims, rescue workers), among themselves in the foreground area 130. In addition, equipment 200 enables communications between foreground users A, B, C, D and the ground hub 110 in the background region 132. The embodiment of FIG. 2 includes beam forming technology onboard M2 rather than having a GBBF facility in the background area 132.

Equipment 200 comprises mostly electronic circuits and antennas, and the mechanical housing. Equipment 200 is used in both the return link and the forward link communication. The direction in the return link is from the users in the foreground area 130 to a background area 132, or from left to right as depicted in FIG. 2. The direction in the forward link is from a background area 132 to a foreground area 130, or from right to left as depicted in FIG. 2. Equipment 200 comprises three sections, a foreground input module 210 (e.g. operating at L/S frequency band) that is electrically connected to a frequency converter module 220 (e.g. from the L/S frequency band to the Ku/Ka frequency band) that is electrically connected to a background input module 230 (e.g. at the Ku/Ka frequency band). Other embodiments of equipment 200 substitute other possible operational frequency bands for the foreground input module 210, such as for the rescue workers who have devices that receive and transmit at 4.9 GHz that is presently reserved for public emergency services. Also, users A, B, C, D in the foreground 130 are assumed to have devices that operate in the L or S frequency band because most people have tri-band cellular phones or WiFi equipment that operate in these bands. But these frequency bands serve to illustrate these embodiments; other frequency bands may be utilized instead.

A multi-beam antenna 217 has many antenna array radiating elements 217a (e.g. six are shown in FIG. 2) in the foreground input module 210. As examples, the multi-beam antenna 217 includes a beam-forming network (BFN) and also a set of array elements 217a that may be implemented as planar arrays, reflector antennas, phased arrays, radiators and so on. The antenna array elements 217a are used for transmission both in the forward links (from background 132 to M2 to foreground 130) and receptions in the return links (from foreground 132 to M2 to background 130). The input and output nodes of the multi antenna array elements 217a are electrically coupled to the beam forming network module BFN 211 that is electrically coupled to beam ports 212 that is electrically coupled to diplexers 213. The diplexers 213 operate such that in the forward link direction, the beam ports 212 are electrically connected to power amplifiers 215. In the return link direction, beam ports 212 are electrically connected to low noise amplifiers LNAs 214 because the input signals from the return links in the foreground 130 are often weak and should be amplified.

The frequency converter module 220 (e.g. transponder) comprises at least two pairs of frequency translation units, one for the forward link and one for the return link. The forward link band pass filters and then frequency down converts signals from the Ku/Ka band (14/30 GHz) to the L/S band (½ GHz). The return link units up convert the frequencies from the L/S band to Ku/Ka band. This frequency conversion is due to the choice of frequencies selected to transmit signals on the background links 112. If the transmission to the hubs 110 were also operating in the L/S frequency band, then a converter module 220 is usually not needed, other than perhaps some band pass filtering to reduce high or low frequency noise and interference.

The background input module 230 comprises two groups of beam signals. In the return link direction, the multiplexers 231 combine the beam signals (two shown) in the Ku/Ka band into a single signal stream; the single signal stream is then amplified by a power amplifier PA 233, then duplexed by an antenna diplexer 234 before being radiated by the background-link antenna 236. As an example, the background-link antenna 236 is a high gain tracking beam antenna that is pointed to a ground hub 110. Antenna 236 is mounted on M2, as M2 flies above the foreground region 130. Alternatively, the background-link antenna 236 is a low gain antenna that is omnidirectional, which sometimes simplifies the tracking mechanism or reduces costs, but has a shorter range.

Similarly for signals in the forward link direction, the background-link 112 (or feeder-link 112) signals received by the antenna 236 and I/O duplexer 234 are conditioned by the LNA 235. The demultiplexing devices 232 separate the beam signals by frequency grouping the conditioned signals (FDM demuxing). The grouped beam signals are separated into various beam-ports 212 before they are translated from the Ku/Ka frequency band into an L/S frequency band by the frequency converter module 220. These down converted signals are amplified by power amplifiers PA 215 in the foreground input module 210 before being radiated by the multi-beam antenna 217.

In the embodiment of FIG. 2 and other figures, the multiplexers 231 and the de-multiplexers 232 perform frequency division multiplexing (FDM). However, in other embodiments, the muxing/demuxing functions of 231/232 are configured for other schemes such as for time division multiplexing (TDM), code division multiplexing (CDM), or some combinations of FDM, CDM and/or TDM.

In operation, the circuits of FIG. 2 enable both return link and forward link communications through the equipment on a UAV 120 such as M2 that has coverage over the foreground area 130. M2 provides a relay mechanism for communications among users (A, B) and (C, D) who are located in two beam regions 1302 and 1303, respectively. M2 also relay signals between the foreground area 130 and background area 132. There are no switching or connecting mechanisms among users A, B, C, and D, nor on M2's communication equipment. The switching or connecting functions are performed by the ground hub 110. Also, M2 carries a beam forming network BFN 211 to direct and shape the transmitted/received signals. For example, BFN 211 comprises analog circuits to concurrently shape radiation patterns focusing various beam signals to different output transmission beam regions 1301, 1302, and 1303. For instance, the first signals in a first beam port 212 in transmitting mode are directed to a first beam region 1301, second signals in a second beam port 212 are directed to a second beam region 1302, and third signals in a third beam ports 212 are directed to a third beam region 1303. In one embodiment, first, second and third signals are radiated in a same frequency slot but delivered, concurrently, by the BFN 211 to three separated beam regions.

As an operational example with respect to FIG. 2, M2 acts as a roving cell tower over the foreground region 130. User A in beam region 1303 sends a data string to a user D in beam region 1302 through the equipment 200 on M2. User A uses a cell-phone or other portable device. M2 detects the data string via its multi-beam antenna 217. The data string is amplified by a LNA 214, filtered and frequency converted translated by frequency converter module 220, power amplified by PA 233 and then radiated by the ground-link antenna 236 in the Ka or Ku frequency band. Hub 110 detects and receives the data stream from M2 and assigns the stream to a forward link beam port, through which the data will be delivered back to a desired receiving user D in the beam region 1302 in foreground 130.

As another example of operation that may occur concurrently with the actions of users A and D, another user C in beam region 1302 sends a different data string to a user B in beam region 1303. On M2, the foreground input module 210 detects the data via the multi-beam antenna 217; the data is amplified by a LNA 214, filtered and frequency converted in 220, then power amplified at 233 and then radiated by the ground-link antenna 236 to hub 110. The hub 110 assigns the received data stream to a second one of the beam ports 212, in the forward link, that delivers the data to the desired receiving user B in beam region 1303.

In the forward link direction, M2 and its electronics provide one-way forward communications such as for broadcasting or multicasting. As an example, the forward link performs mobile communications using the on-board beam forming network BFN 217. M2 can also relay information or data or a broadcast that comes from the terrestrial networks 102, through a gateway hub 110, then through equipment 200 on M2, finally to mobile users in the foreground region 130. The data or broadcast is designated for a forward link beam port, where the data was up-loaded via the background-link 112 and detected by the background-link antenna 236. The detected signals are conditioned via LNA 235 and band pass filtered before being FDM demultiplexed to a common intermediate frequency by a demultiplexer 232. The demultiplexed components comprise different beam signal streams for various beam ports 212 of the multi-beam antenna 217.

Figure 3:
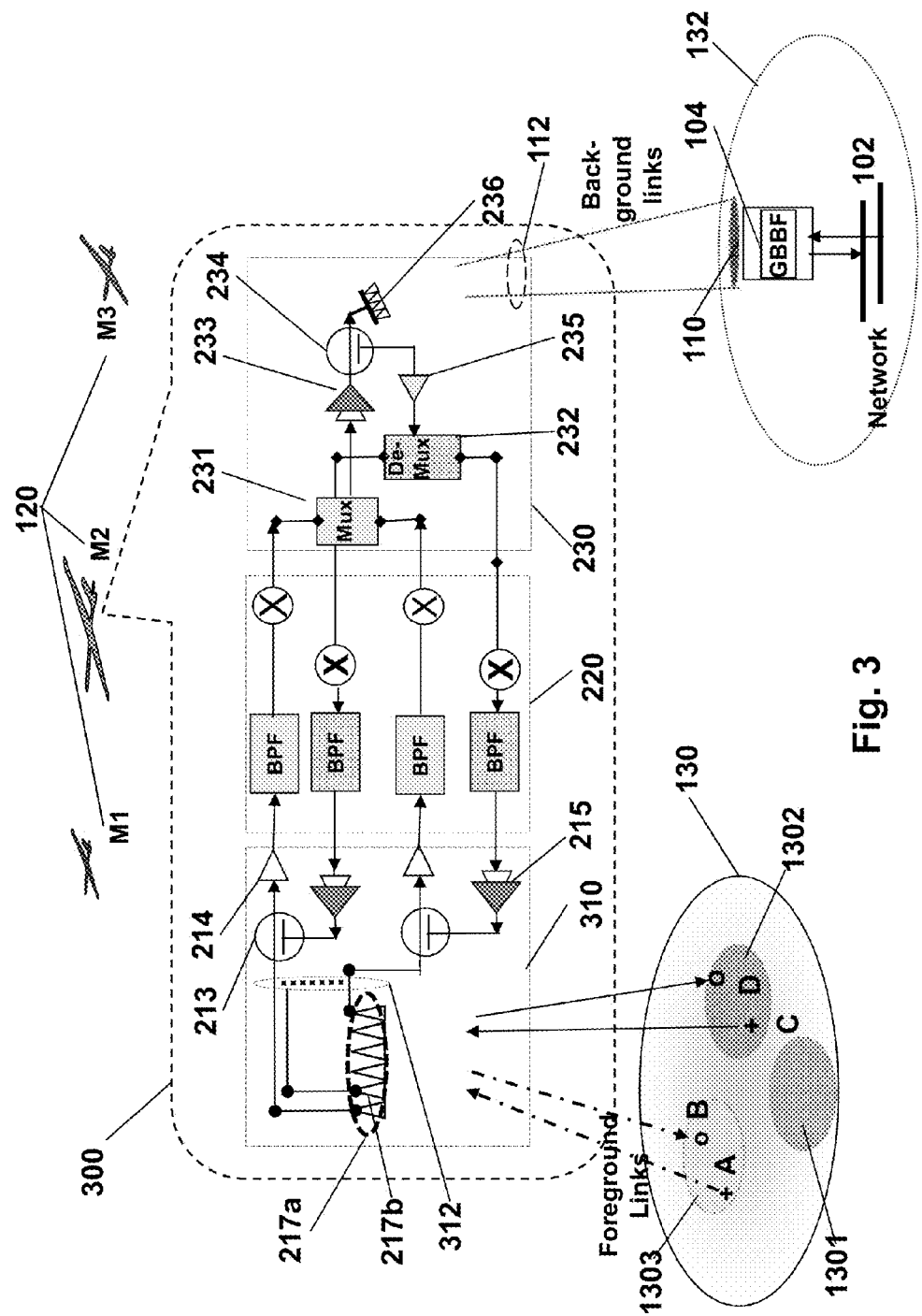
FIG. 3 depicts a block diagram of another embodiment of the communications equipment onboard one aircraft.

FIG. 3 depicts another exemplary embodiment of the communications equipment 300 onboard an aircraft M2 to relay communications to and from users A, B, C, D (e.g. victims, rescue workers) among themselves and with a hub 110 in the background area 132. The configuration and electronics equipment 300 depicted in FIG. 3 is similar to that of FIG. 2 (equipment 200). However, in FIG. 3, the communications equipment 300 does not have an on-board beam forming network. Rather, there is a ground based beam forming GBBF facility 104 in the background area 132. GBBF facility 104 and hub 110 perform many functions of an on-board beam forming network such as encoding the signals transmitted to M2 to include beam shape, modulation, and other information.

In FIG. 3, the embodiment of the onboard multi-beam antenna 217a now has many individual array radiating elements 217b that operate to receive and transmit signals such as in the L/S frequency bands. Antenna elements 217b are used for both transmission in the forward links and reception in the return links. The inputs/outputs of the antenna 217a are the radiating element ports 312 that are electrically connected to the diplexers 213. The diplexers 213 operate such that in the forward link direction, the radiating element ports 312 are electrically connected to power amplifiers 215. In the return link direction, radiating element ports 312 are electrically connected to low noise amplifiers LNAs 214. Only two channels are shown, and similarly only two pairs of channels are shown in the frequency converter module 220, but there can be additional channels in other embodiments. Much of the rest of the electronics such as the background input module 230 are similar to that shown in FIG. 2, except for the GBBF facility 104 that is described later on with respect to FIGS. 4, 5, 8, and others.

Figure 4:
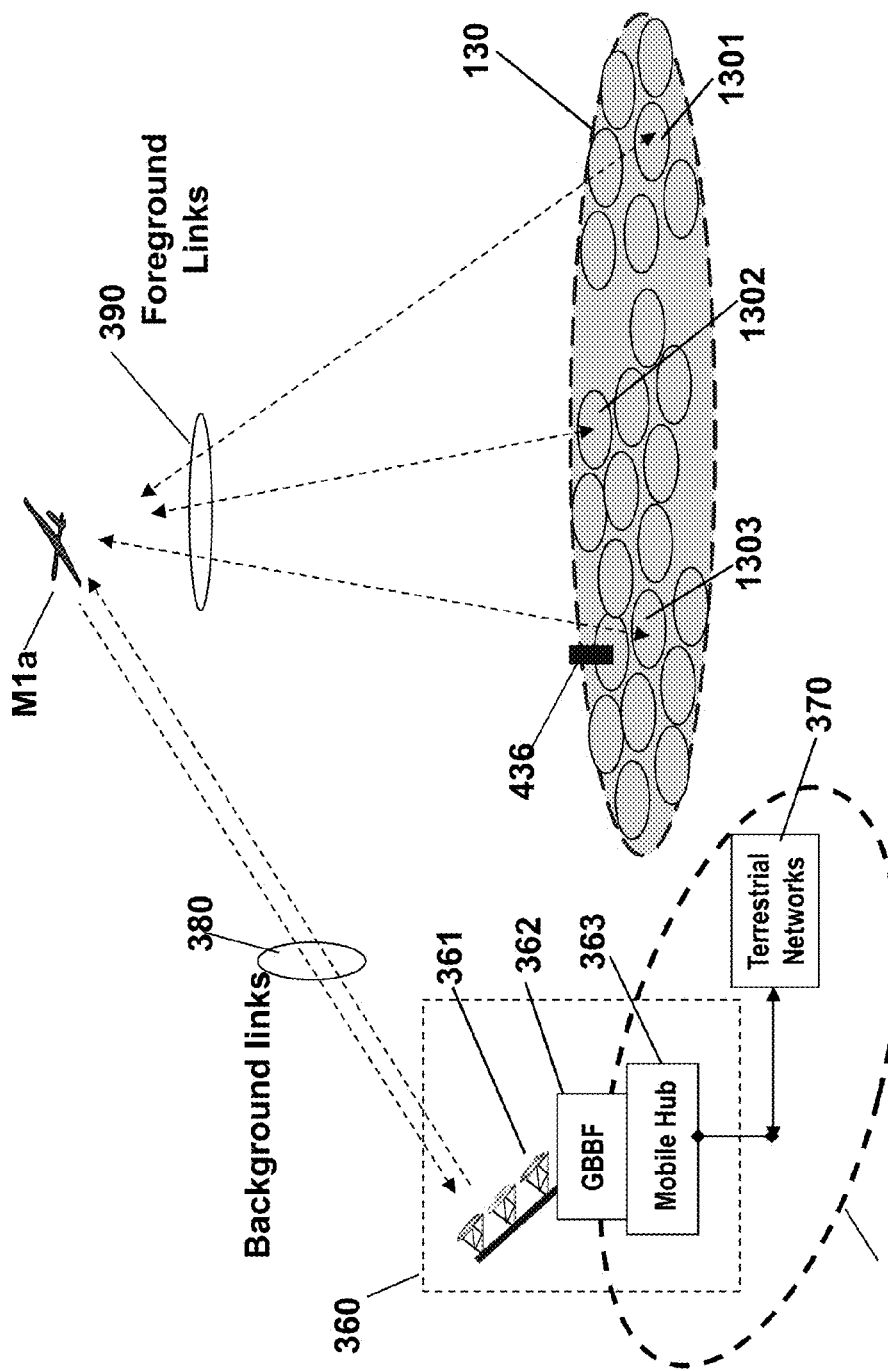
FIG. 4 depicts a communication scenario for one un-manned air vehicle ("UAV") and users located in a foreground region.

FIG. 4 depicts an exemplary communications scenario with only one air vehicle M1a that flies to cover the foreground region 130 and also communicates with a ground hub 360 in the background area 132. FIG. 4 is used to illustrate various tasks or missions that a single air vehicle can undertake, such as a relay mission, broadcast or multicast mission, or RF receiver mission, all of which are discussed in turn in the following paragraphs. Using one air vehicle to perform multiple functions may simplify possible coordination or synchronization issues with other air vehicles.

For a relay mission, the air vehicle M1a relays communication signals among people such as the residents or rescue workers located in the foreground area 130, and also to the outside, with ground hub 360 in the background area 132. In the foreground area 130, the people may have devices, phones, laptops, radios, pagers, etc., that operate in the L/S frequency band or C band frequencies that are reserved for public safety emergencies. In the background area 132, the people have ground hubs 360 that receive and transmit information at some other frequency such as the Ka or Ku band. The ground hub 360 includes frontend transceivers 361, a ground based beam forming GBBF facility 362, mobile hubs 363, and terrestrial networks 370.

In the example of FIG. 4, the wireless communication links between M1a and the foreground area 130 are designated as the foreground links 390 that couple wirelessly with multiple spot beam regions 1301, 1302, and 1303. For example, the coverage area may span up to 100 Km in diameter, but varies depending on the type of mission performed. The wireless communication links between the air vehicle M1a and the background area 132 are designated as the background links 380.

In the return link direction, ground hub 360 receives signals in its frontend transceivers 361 from the background-link 380. A processor circuit or computer in the GBBF facility 362 performs some of the following activities (1) recover the precision amplitudes and phases incurred in the received signals from the on-board antenna 217a radiating elements (217b, e.g. FIG. 3), (2) perform receiving (Rx) digital beam forming (DBF) processing on the recovered radiating element port 312 signals and generate received beam signals, and (3) demodulate the received beam signals, converting the waveforms of the beam signals into data strings or, alternatively, the mobile hubs 363 or terrestrial networks 370 performs the tasks. Further details of one embodiment of a GBBF facility 362 are provided in FIG. 8.

In the forward link direction, the processor in the GBBF facility 362 performs some of the following (1) obtain or generate from the terrestrial networks 370 or mobile hubs 363, beam-signals that include modulation and channel formatting, (2) perform transmitting (Tx) digital beam forming (DBF) processing and generate parallel radiating element port 312 signals, such as using baseband frequencies, and (2) multiplex the parallel radiating element port 312 signals (e.g. FDM, TDM, CDM) that are then upconverted to a frequency such as in the Ku/Ka band before being transmitted to the air vehicle M1a.

Onboard the air vehicle or UAV M1a, in one embodiment, the electronic equipment is similar to that depicted in FIG. 3. For example, in the forward link direction, the antenna radiating element port 312 signals received by the background antenna 236 and I/O duplexer 233 are conditioned by an LNA 235. The Ku/Ka band demultiplexing devices 232 separates the conditioned radiating element port 312 signals to various ports before down-converting them from the Ku/Ka frequency band into the L/S or C band. These signals are amplified by individual power amplifiers 215 and then transmitted by the antenna array elements 217a. These signals are concurrently delivered by M1a to various users in the foreground area 130. The radiating element port 312 signals for various antenna array elements 217a were encoded with designations and destination information so that particular port 312 signals are sent to specific users coherently in various spot beams 1301, 1302, and 1303 in far-field over the foreground area 130 for enhanced signal qualities. As such, the configuration of FIG. 4 restores mobile communications for residents such as in a disaster area, via an air vehicle or UAV 120, and through the implementation of a GBBF facility 362, strengthens and directs the signals. The processing and transmission is performed concurrently even when there are multiple calls or many transmitted beams.

The embodiment of FIG. 4 also serves as a communication relay for teams (e.g. rescue workers in the foreground area 130) having phones or more specialized communication devices 436 that operate at other frequency bands (e.g. emergency bands). Moreover, the persons are not limited to rescuers, the word "team" or "rescue workers" basically refers to another group of devices that operate at a different frequency from the residential or commercial frequencies used by the residents of the local foreground area 130. The configuration of FIG. 4 also functions where the communication terminals 436 have omni directional reception and transmission.

Figure 7:
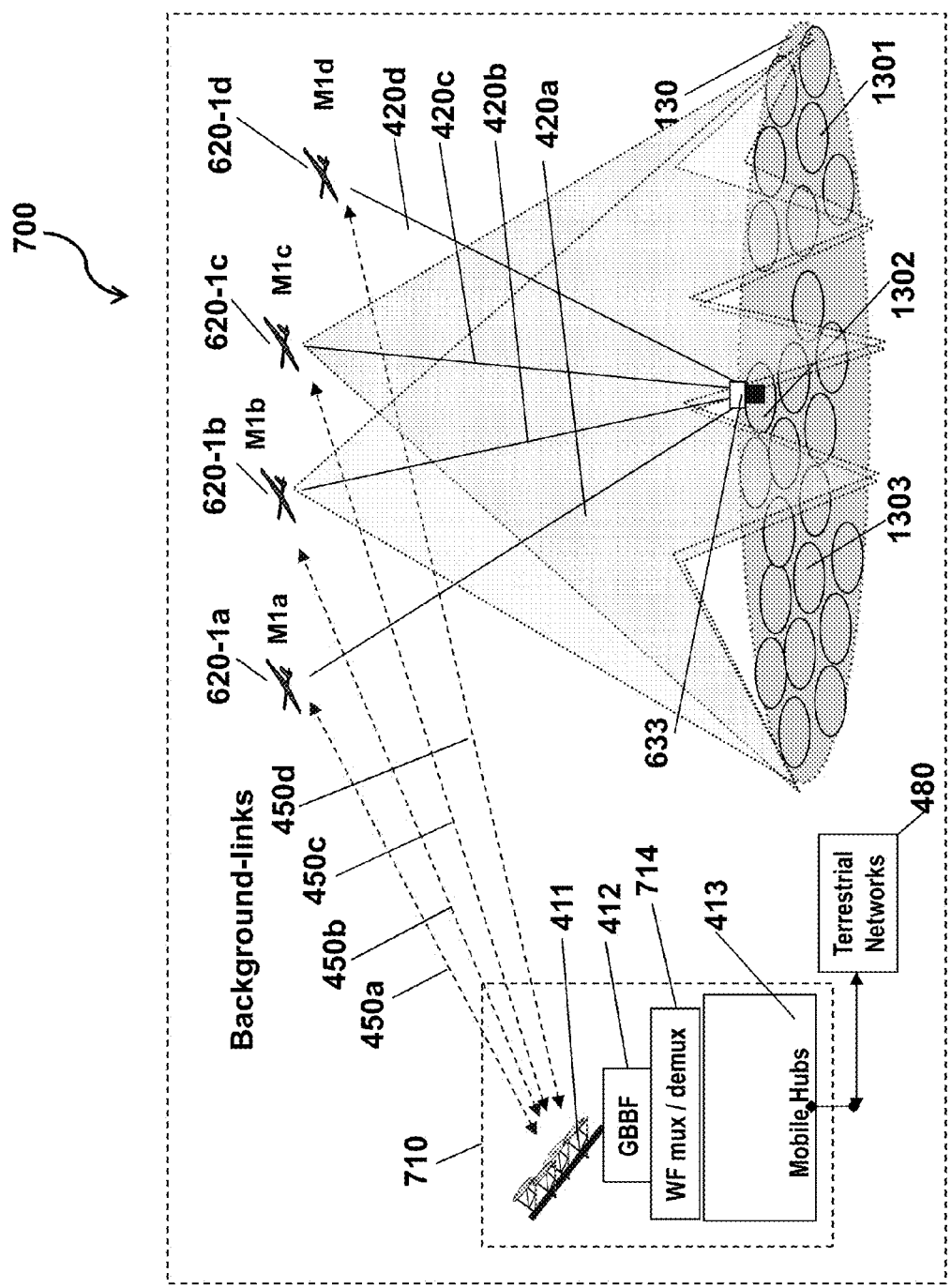
FIG. 7 depicts another operational communications scenario with multiple UAVs.
Figure 7A:
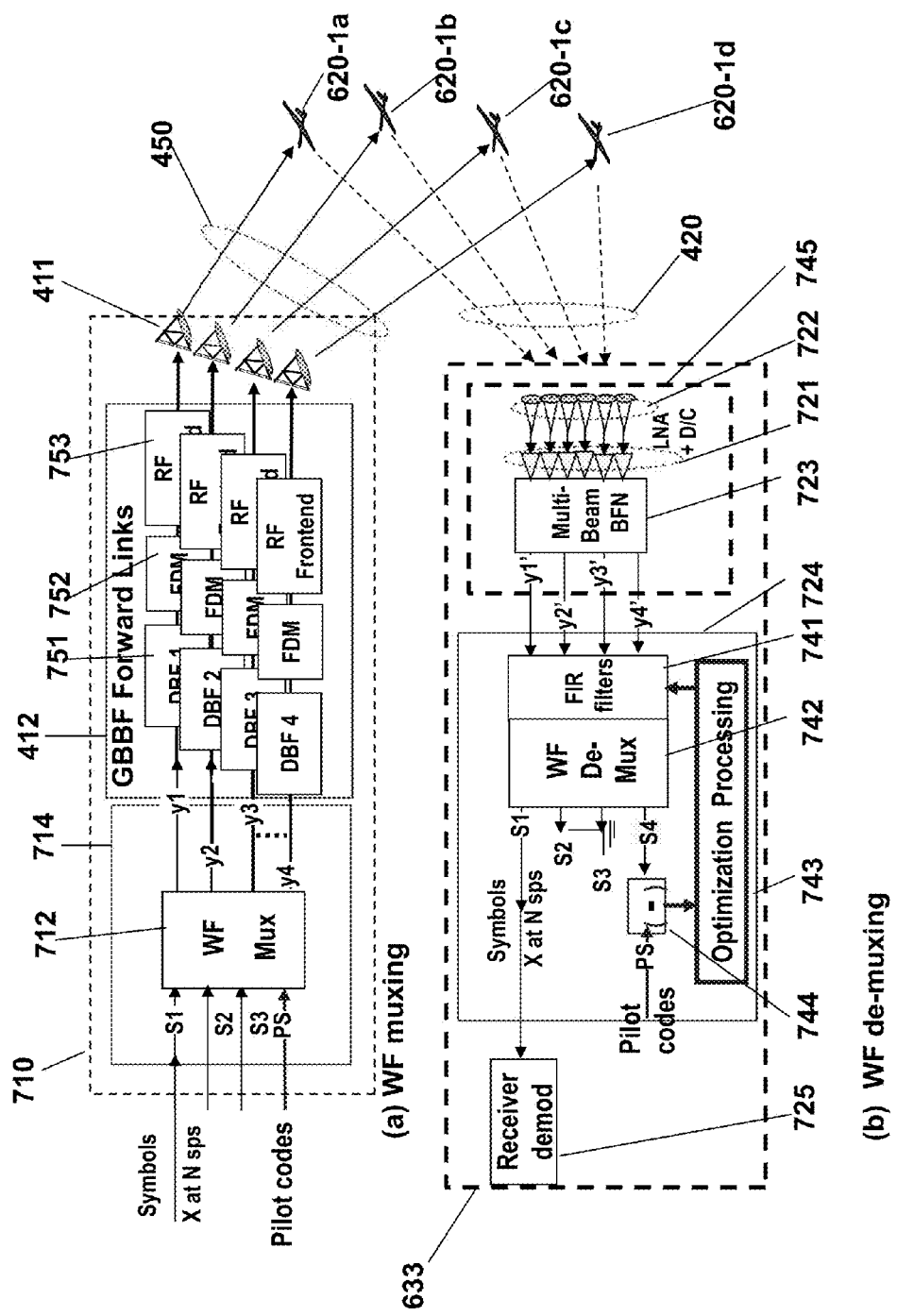
FIG. 7a depicts a block diagram of an embodiment of a forward link that includes wavefront multiplexing.

FIG. 4 also serves to depict using an air vehicle or UAV M1a for broadcasting and/or multicasting to the rescue workers or to emergency or weather band radios operating at a different frequency from the S/L band. This operational example uses a GBBF facility 362 or remote beam forming (e.g. beam forming techniques performed anywhere other than on the air vehicle) to improve the signals sent out to multiple receivers in the foreground area 130. Some techniques and apparatuses for remote beam forming are described in U.S. Pat. No. 8,098,612. Alternatively, the frontend 361 includes multiple beam antennas, and the digital beam forming (DBF) is performed using reconfigurable FPGAs, PLAs, computers or other processors in the GBBF facility 362 that can also obtain additional information such as the atmospheric conditions, distance parameters and so on. Yet alternative techniques are depicted in FIGS. 7, 7a, 7b, etc., and described below.

The FIG. 4 configuration also serves to depict another operational embodiment, RF receiving functions in the return links via an air vehicle or UAV M1a and remote beam forming such as with the GBBF facility 362. The rescue workers have apparatuses (e.g. tracking devices) that send one-way communications to M1a, having equipment such as 300 in FIG. 3, that relays the information to the ground hub 360 through the background link 380. The frontend receivers 361 comprise bi-static radar receivers. Ground hub 360 is modified (e.g. FPGA is reprogrammed or a software sub-block or subroutine is exercised) to perform not only the functions of beam forming via GBBF facility 362, but also signal processing functions of range gating, Doppler frequency separations, as well as additional radar/imaging processing.

The FIG. 4 configuration also serves to depict another similar operational embodiment serving users in a foreground area 130 with a single air vehicle M1a but to or from multiple ground hubs 360 located in various background sites 132. Each background site 132 has a different set of wireless background links 380 to M1a.

Figure 5:
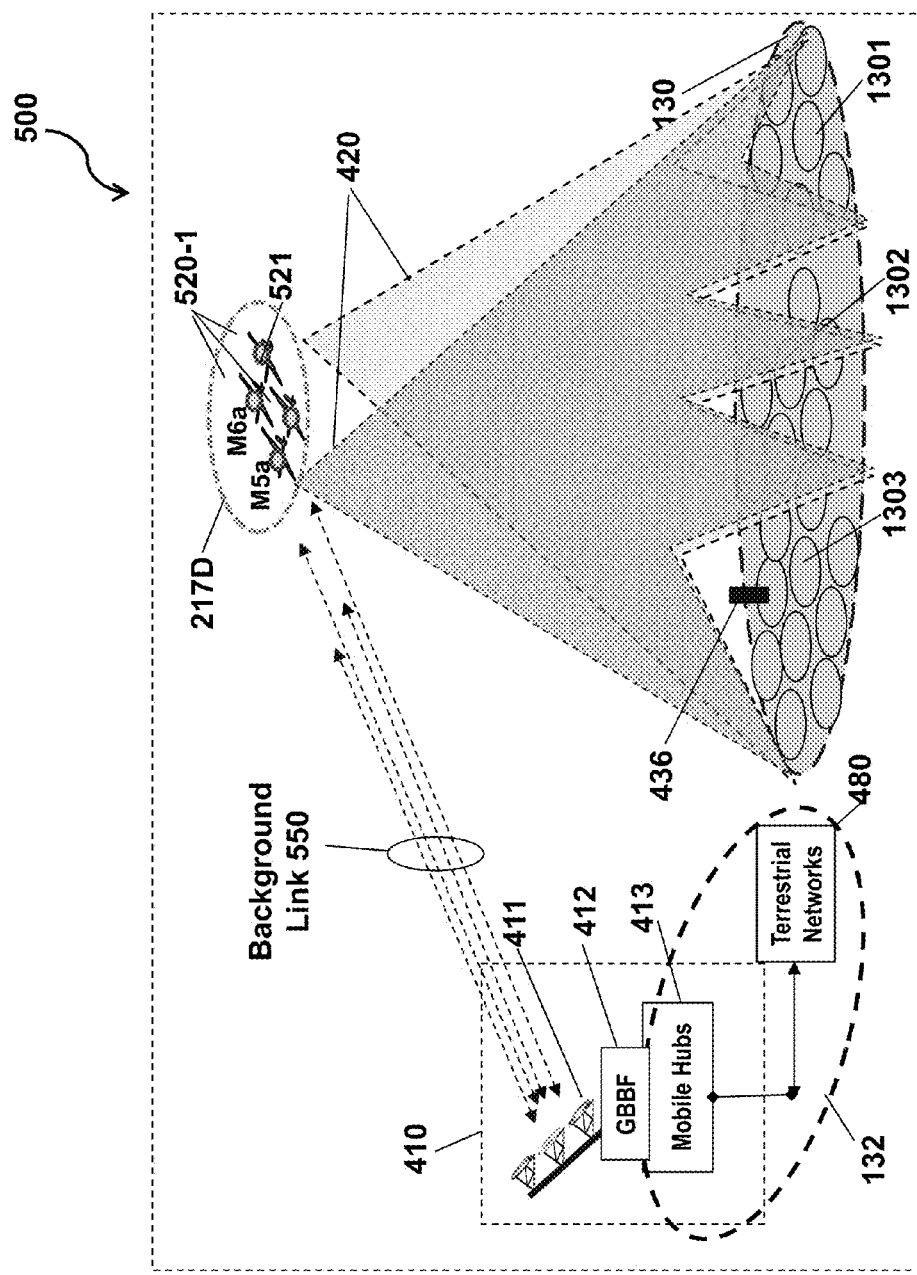
FIG. 5 depicts another operational communications scenario with multiple UAVs.

FIG. 5 depicts another architectural embodiment of using airborne vehicles as communications towers or relays. There are multiple (e.g. four) air vehicles or UAVs 520-1, that perform a communication relay mission covering the foreground area 130 that is approximately 100 Km in diameter, a distance that depends on the nature of the mission. The UAVs 520-1 fly in formations spaced closely together, such as within 10 meters or less. The foreground links 420 wirelessly connect to multiple spot beams 1301, 1302, and 1303 services cell phones and other devices that operate in the L/S frequency band or some other popular frequency band used by consumers. Such consumer devices usually have omni directional reception and transmission. Onboard each of the four UAVs 520-1, the equipment in one embodiment is similar to that depicted in FIG. 3.

The embodiment of FIG. 5 also serves as a communication relay for more specialized communication terminals 436 that operate at other frequency bands (e.g. emergency bands on devices carried by rescue workers). The terminals 436 are located in the foreground area 130 and they usually have omni directional reception and transmission.

In the return link direction, the ground hub 410 in FIG. 5 receives and conditions signals brought in through the background-links 550 and through its frontend receiver 361. The signals are received from radiating element ports 312 (e.g. FIG. 3) from all four UAVs 520-1. A processor in the GBBF facility 412 (1) recovers the precision amplitudes and phases from the received signals from all four UAVs 520-1, (2) performs receive Rx digital beam forming (DBF) on the recovered signals to generate received beam signals, and (3) performs other processing such as demodulation to convert the waveforms of the beam signals into data strings before delivering the data strings to the mobile hubs 413 and terrestrial networks 480.

In the forward link direction of FIG. 5, the GBBF facility 412 (1) receives data or information from the mobile hubs 413 or terrestrial networks 480 after they perform modulation and channel formatting, (2) the GBBF 412 performs transmit Tx digital beam forming processing on the data and information and generates parallel element signals in the baseband frequencies, for example, (3) multiplexes (e.g. FDC, CDM, TDM) the parallel element signals, and frequency upconverts them to the Ku/Ka frequency band for transmission to the four UAVs 520-1 via the background-links 550. Because there is no on-board beam forming algorithms on the air vehicles UAVs 520-1, the GBBF facility 412 performs beam forming. Each of the UAVs 520-1 converts the parallel element signals into beams by directly radiating into space using the array elements 217b, a technique such as described with respect to FIG. 3. Multiple beam-signals are designated to be sent to particular users in the various spot beams 1301, 1302, and 1303. These transmitted beam signals are delivered to various users in the foreground area 130, concurrently.

In the forward link direction in an operational scenario, the ground hub 410 is in wireless communication through the UAVs 520-1 to receivers in the foreground area 130, from which data sources A and C sent their signals. The UAVs 520-1 go through the enhancements of beam forming provided by the GBBF facility 412. In another embodiment, the UAVs 520-1 can also optionally by-pass the beam forming enhancing actions of the GBBF facility 412 and send the communication to a designated receiver in the foreground area 130. For example, A calls C, and C receives the call via the UAVs 520-1 without the aid of the GBBF facility 412.

In an embodiment of FIG. 5 for either the forward or return links of the mobile communications, there is a GBBF facility 412 that provides the remote beam forming for the signals that will be transmitted by each antenna array 217 on each UAV 520-1. Also, in either the forward or return links, the selected frequency band (e.g. Ku/Ka) and the background links 550 comprise adequate instantaneous bandwidths to support the signal transmissions with multiple UAVs 520-1, concurrently. To increase bandwidth, one embodiment includes using multi-beam antennas 411 (in the background hubs 410), and providing orthogonal beams concurrently to all of the UAVs 520-1 to facilitate frequency reuse in the background links 550. For the foreground 130 communications, in one embodiment, each of the UAVs 520-1 carries different electronic equipment that transmits a different group of beams that operate in various frequency slots, have different groups of codes, and/or time slots. For example, UAV M5a is configured for code 1 in CDM or frequency slot 1 in FDM, UAV M6a is configured for code 2 in CDM or frequency slot 2 in FDM, and so on. Thus, each UAV 520-1 supports an independent data stream. Then the relative positions among the antenna arrays 217 on the different UAVs 520-1 become less important. The radiated RF powers associated with the independent data streams among various UAVs 520-1 are not coherently combined. Instead, the information or independent data streams are optionally combined for high data rate users via another method such as channel bonding or non-coherent combining.

In another operational embodiment of FIG. 5 for either the forward or return links of mobile communications, there is a GBBF facility 412 that provides the beam forming for distributed array elements 217a (e.g. array 217a is replicated four times), where each is now considered to be a sub-array and is on a different UAV 520-1. The aggregated or distributed array "217D" has four sub-arrays 217a distributed on four UAVs that are dynamically moving relative to one another. The distance between the UAVs 520-1 varies slowly by less than 1 to 3 meters. As a result, there is also a slow variation of distances between the sets of electronic equipment/antennas onboard each UAV 520. The slow-variation creates a determinable and calculable incoherency or variation in path lengths among the signals between each antenna sub-array 217a on each UAV 520. The slow varying distributed array position and geometry is continuously calibrated and then compensated for, in both the forward link and return link, as one of the functions of the GBBF facility 412. Multibeam GNSS (global navigation satellite systems) or GPS receivers or multiple (at least three) accelerometers and gyroscopes on each UAVs 520 provides information on the positions and orientations of individual UAVs 520. The dynamically-changing geometries of this distributed array 217D are thus measured, and then calculated and predicted in advance. The data and information from the UAVs 520 are transmitted to the GBBF facility 412 for processing for calibration and compensation purposes. This operational scenario allows coherently adding together radiated signals from multiple UAVs 520-1 to form a stronger signal to punch through (overcome) atmospheric interference or man-made structures obstructing users with lower quality devices (e.g. weaker reception) or positioned at disadvantaged locations.

FIG. 5 also serves to depict using multiple air vehicles or UAVs 520-1 for one-way broadcasting and/or multicasting to devices. This operational example uses a GBBF facility 412 or remote beam forming (e.g. beam forming techniques performed anywhere other than on the air vehicles) to improve the signals sent on the forward links. Two embodiments include (1) each of the UAVs 520-1 supports an independent data stream and a different group of signal beams such as TDM, FDM, CDM, or some combination of these, and so on; or (2) an antenna array 217D is distributed among the multiple UAVs 520-1 that are flying in slowly-varying relative flight distance pattern. Then in the foreground area 130, through WF MUXing and/or spatial power combining, device 436 coherently adds together signals from the multiple UAVs 520-1, a procedure which yields an effectively stronger broadcast or multicast signals. In one embodiment (1), the UAVs 520-1 are multiplexed through conventional TDM, FDM, and/or CDM techniques. In another embodiment (2), the UAVs 520-1 are dynamically "maintained" coherently as a distributed array.

The FIG. 5 configuration also serves to depict an embodiment as a one-way receiver-only using multiple air vehicles or UAVs 520-1 and remote beam forming such as using the GBBF facility 412. The UAVs 520-1 provide a one-way return link (receiving only). In one embodiment, the onboard electronics and array radiating elements 217a are similar to the ones shown in FIG. 3.

As an operational example of receiving a communication, one of the UAVs 520-1 serves to relay the data from a data source A in the beam position 1303 in the foreground area 130, to a ground hub 410. Concurrently, the UAVs 520-1 also provide wireless interconnections from other possible callers (e.g. data source C in the beam position 1302) to the ground hub 410. In one configuration, the ground hub 410 is electrically connected to data receivers via terrestrial networks 480 in the background area 132. The ground hub 410 performs receiving functions concurrently for many beams sent by the multiple UAVs 520-1.

Two embodiments of the return link (receiving function) include (1) each of the UAVs 520-1 support an independent data stream and different group of signal beams such as TDM, FDM, CDM, or some combination of these, etc.; or (2) the antenna array 217D comprising multiple subarrays 217a is distributed among the multiple UAVs 520-1 flying a slowly-varying relative flight distance pattern, and through calibration and corrections, a coherently added-together signal from the multiple UAVs 520-1 provides a stronger broadcast or multicast signal. The coherently added-together signal enhances the received signal-to-noise ratio (SNR) of the phone or other device.

To facilitate the second scenario where the array 217D is distributed among the different UAVs 520-1, additional information is included in the calculations. Multibeam GNSS receivers 521 such as GPS, accelerometers and gyroscopes are placed on the individual UAVs 520-1 to obtain the current positional status and the platform orientations. Similarly, multiple GNSS receivers at known locations on an UAV 520-1 may also provide information on the bearing of the air vehicle. For instance, the current position and orientation of each sub-array 217a on a moving UAV 520-1 is calculated with respect to a dynamic, aggregate coordinate system moving with the mean velocity and vector-summed direction of all of the participating UAVs 520-1. Thus the positions and orientations of a dynamically moving aggregated array 217D, an array that is actually distributed among multiple UAVs 520-1, are calculated instantaneously, providing the trajectory of the aggregated array 217D on different UAVs 520-1. In addition, the projected (predicted) trajectory over the next few seconds can also be obtained and included in the calculations to coherently add together the beam signals from the multiple UAVs 520-1.

In FIG. 5, in one embodiment where the UAVs 520-1 provide a one-way return link (receiving only) service that includes bi-static radar receiver functions, where the transmitter and receiver are separated by some distance. For example, the receivers are located on the UAVs 520-1 and the transmitters are on GNSS satellites. Some GNSS satellites radiate ranging codes in the L band; DBS satellites in the Ku band radiate broadband signals toward different coverage areas over a land mass; spot beam satellites radiate in the Ka band and cover metropolitans areas; shaped beam satellites also radiate in the C-band, and so on. In bi-static radar receiving applications, the coherent combining of signals (e.g. that are reflected by a common target such as a lake or building), captured by multiple UAVs 520-1, provides improved SNR and also better spatial resolutions. RF illuminators for these bi-static or multi-static radars may include many of the GNSS satellites operated in the L frequency band for global coverage, C frequency band for land and ocean coverage, or Ku and Ka frequency band for land mass coverage or equatorial coverage.

Figure 6:
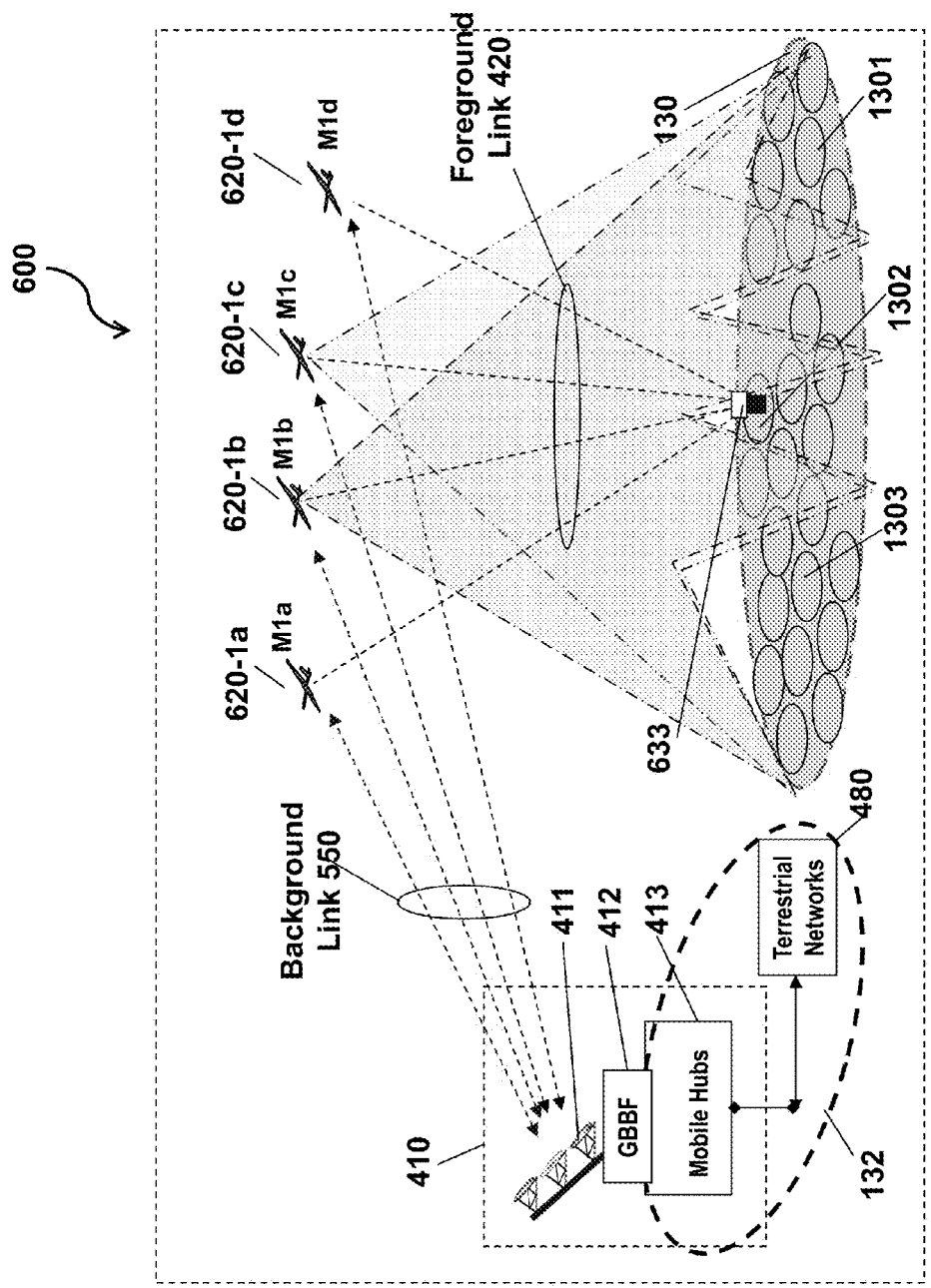
FIG. 6 depicts another operational communications scenario with multiple UAVs.

FIG. 6 depicts a scenario with multiple (e.g. four) air vehicles or UAVs 620-1 that are flying together but spaced a large distance apart such as by over 0.3 Km. The foreground area 130 is on the order of 100 Km in diameter or less. UAVs 620-1 perform a communication relay mission covering the foreground area 130 where ground user terminals (electronic devices) 633 operate in the L/S/C frequency bands, but terminals 633 have additional features such as the ability to transmit or track and receive multiple signal beams, concurrently, and follow all four of the UAVs 620-1, independently. Instead of omni directional antennas, terminals 633 have multi-beam antennas that transmit and receive concurrently in selected directions. The multiple beam signals comprise sets (e.g. four) of independent data that are transported at the same frequency in the four wireless foreground links 420, located between each of the UAVs 620-1 and a terminal 633.

In the return link direction, the ground hub 410 in FIG. 6 receives and conditions, or amplifies and filters, signals from four UAVs 620-1 brought in through four individual background-links 550 and through the frontend multiple beam antennas 411 of the ground hub 410 located in the background area 132. A processor in the GBBF facility 412 in ground hub 410 (1) recovers the precision amplitudes and phases from the received radiating element port 312 signals from all four UAVs 620-1, (2) performs Rx digital beam forming (DBF) on the recovered element port 312 signals to generate received beam signals, and (3) performs other processing such as frequency conversion or demodulation to convert the waveforms of the beam signals into data strings. In addition, there is (4) channel bonding (combining non-coherently) of the received beam signals to form a string of the received data string before delivering the data strings to the mobile hubs 413 and terrestrial networks 480. Channel bonding is performed on each beam signal from each UAV 620-1. The order of the operations (3) and (4) may be reversed if the signal modulations in all four background-links 550 are identical.

In the forward link direction of FIG. 6, the GBBF facility 412 (1) receives data or phone beam signals from the mobile hubs 413 or terrestrial networks 480 after they perform modulation and channel formatting. The data or phone signals are designated (encoded) for a particular user in the foreground area 130. The GBBF facility 412 also (2) segments the modulated signals into four substream beam signals, one for each background link 450 depicted in FIG. 6, (3) performs four concurrent but independent Tx DBF processing on each of the substream beam signals, each of which will be transmitted by one of the four UAVs 620-1, and (4) up-converts to the Ku/Ka frequency band and FDM multiplexes these signals to send to the four UAVs 620-1 via the background-links 550. Each substream beam signals is sent to the designated user in a spot beam such as 1302 in the foreground area 130. The user with a terminal 633 with multi-beam reception capability will have an advantage of four times the channel capacity as compared to the capacity from a single UAV 120.

In scenarios with multiple users, multiple substream beam signals in the forward links are sent to the designated users in various spot beams 1301, 1302, and 1303 in the foreground area 130. These transmitted substream beam signals are delivered concurrently to various users via the same set of four UAVs 620-1. The user with a terminal 633 with the multi-beam reception capability uses one of the four beams. The remaining bandwidth assets associated with the three other beams in the same frequency slot is available for other users with multibeam reception capability in the same beam position.

Because particular groups of users (e.g. rescue workers, soldiers, law enforcement, etc.) are more likely to have terminals 633, the operation of the embodiment of FIG. 6 tends to involve these people rather than the typical resident in the foreground area 130. The terminals 633 are able to concurrently track all four UAVs 620-1 that have four separated beams operating at the same frequency such as the public safety emergency band. Because the air vehicles are spaced far apart, there is good isolation among the multiple UAVs 620-1 even though the beams are at the same frequency. Decoding and encoding and time separation are achieved through spatial isolation. As a result, the same spectrum can be used multiple (e.g. four) times as compared to the scenarios where the UAVs 120 are flying closely together.

In an operational embodiment of FIG. 6 for either the forward or return link direction of the mobile communications, there is a GBBF facility 412 that provides the beam forming for the signal for each antenna array 217, independently, on each UAV 620-1. Also, the selected frequency band (e.g. Ku/Ka) and the background links 550 comprise adequate instantaneous bandwidths to support the signal transmissions with multiple UAVs 620-1, concurrently. To increase bandwidth, one embodiment includes using multibeam antennas 411 in the ground hub 410 and providing orthogonal beams concurrently with all of the UAVs 620-1 to facilitate frequency reuse in the background links 450. For the foreground 130 communications, each of the UAVs 620-1 carries different electronic equipment that transmit different groups of beams, operated at various frequency slots, different groups of codes, and/or time slots. Each UAV 620-1 supports an independent data stream. Then the relative positions among the antenna arrays 217 on the different UAVs 620-1 become less important. The radiated RF powers associated with the independent data streams among various UAVs 620-1 are not coherently combined. Instead, the information or independent data streams optionally combined for high data rate users via another method such as channel bonding or non-coherent combining. Alternatively, in another operational embodiment, coherent techniques are used for UAVs 620-1 that are flying far apart. The coherent technique is similar to that described in relation to FIG. 5, for example. However, the slowly varying distance ranges are scaled up because the UAVs 620-1 are flying farther apart than the UAVs 520-1.

Wavefront Multiplexing or Demultiplexing

FIG. 7 depicts a scenario with multiple (e.g. four) air vehicles or UAVs 620-1 that are flying together but spaced a large distance apart such as by over 0.3 Km. Wavefront multiplexing (WF MUX) technology is used in this scenario to perform coherent power combining of the radiated signals to receive stronger and/or encoded signals. Before proceeding to the details of the electronics and system architecture, it is beneficial to briefly review wavefront multiplexing. In 3-dimensions, a wavefront comprises a surface of a wave (e.g. beam of light, multiple beams of telephone signals) that is propagating in space. Mathematically, a wavefront can be represented by a "fat" aggregated vector with many components N, and each component has a phase weight and amplitude weight (coefficients) associated with the vector. In order to transmit the aggregated vector containing many vectors (signals) simultaneously, it is possible to multiplex the individual vectors and then transmit them on a single channel. For example under TDM, time division multiplexing, the vectors are divided into small time segments (slots), and then sequentially transmitted on a single channel. Under wave front multiplexing, WF MUX, all of the vectors are transmitted simultaneously by using many channels. Instead of transmitting each vector on a single, dedicated channel, each vector is again divided into small segments (such as time). The segments are multiplexed so that segments of every vector are transmitted on each of the parallel channels. In this manner if the parallel channels are slightly unequal, e.g. different path length or have some sort of distortion, each vector undergoes the same effect. Then, at the destination, on the receiving end of the multiple channels, there is a demultiplexer and filter (equalizer) to unscramble and compensate for the propagation effects. Thus, the signals from the different channels are coherently combined to recover the original wavefront that was transmitted. Techniques of coherent power combining (before demodulation in a receiver, rather than spatial combining) of the radiated signals enable a receiver to receive stronger and/or encoded signals.

WF MUX involves a number transmission channels N that is greater than one. The number four, e.g. four UAVs 120, 1:4 MUX, etc., has often been used for illustration purposes in this disclosure, but N may be some other value. Electronically, Luneburg lens, Butler Matrices, and Pillboxes are analog multi-beam beam-forming devices and can be implemented as WF multiplexers (muxers). Many digital circuits or software in a DSP also function efficiently as WF muxers, such as 1-D or 2-D Fast Fourier Transform (FFT), 1-D or 2-D Discrete Fourier Transform (DFT), Hadamard transforms, Walsh and Hadamard transforms, and Discrete Harley Transform (DHT).

Turning now to an exemplary configuration, FIG. 7 depicts a scenario with multiple (e.g. four) air vehicles or UAVs 620-1 that relay communications mainly to users (e.g. rescuers) with terminal equipment 633 in a foreground area 130. The M1a, M1b, M1c, and M1d UAVs 620-1 are in communication with a device 633 in the foreground area 130, which operates in the public safety frequency band, for example. The ground hub 710 comprises multiple beam antennas 411 to connected to various UAV platforms 620-1 concurrently via different Ku/Ka band background-links 450, link 450a between the ground hub 710 and UAV M1a; link 450b between the ground hub 710 and UAV M1b; and so on. The ground hub 710 comprises a GBBF 412 for both forward link (transmitting) beams and return link (receiving) beams, and a mobile hub 413 that are gateways to terrestrial networks 480.

Based on the illustration in FIG. 7 of the signal paths from the background hub 710 to the terminal 633, the signal paths can be characterized as having the shape of a "bent pipe," at least in the drawing. The bent pipe embodiment comprises repeater or transponder functions to transmit signals without demodulation and re-modulation. In the forward link direction, the background area 132 has a ground hub 710 with the WF MUX capability, the ground hub 710 uploads or transmits four WF muxed signals 450a-d in the Ku/Ka frequency band, one to each of the four UAVs 620-1. On board the UAVs 620-1, the electronics such as depicted in FIG. 3, down converts the frequency of the WF MUX signals into a frequency that is received and detectable by terminals 633 in the foreground area 130. A terminal 633 receives four signals, 420a through 420d, one from each of the four UAVs 620-1. The terminal 633 has the capability (WF deMUX and FIR filters) to receive the WF MUX signals and coherently power combine them to extract the data and information or phone call, and so on. Thus, in the forward-link direction, the WF multiplex processing occurs before the GBBF 412 (in the ground hub 710), and the associated WF demultiplex processing occurs in a user receiver (in the terminal 633) after the multi-beam DBF, but before demodulation processing.

In the return link direction, the terminal 633 transmits WF MUX signals up to the UAVs 620-1; and the ground hub 710 coherently combines the WF MUX signals. The WF multiplex processing takes place in a user transmitter (in the terminal 633) before the multi-beam DBF, but after modulation processing, and the associated WF demultiplex processing takes place in a ground hub 710 after the receiver multi-beam DBFs, but before demodulation.

In the return link or the forward link, the UAVs 620-1 perform a relay service. The UAVs 620-1 in FIG. 7 comprise similar equipment as those in FIG. 6. But the input/output (I/O) signals on these UAVs 620-1 are the WF multiplexed signals (e.g., y1, y2, y3, y4 in FIG. 7a), rather than the original signals streams (S1, S2, S3 and PS in FIG. 7a). Alternatively, a UAV 620-1 plays an active role and transmits and receive WF MUX signals. For example, if a UAV 620-1 is part of an aerial network of airborne communications towers and the UAV 620-1 transmits to another air vehicle in the network. Then, the WF MUX technology is implemented in the foreground devices, background hub and also in the airborne vehicles UAVs 620-1.

FIG. 7a depicts an embodiment of the electronics in a forward link. FIG. 7a depicts a multi-channel (e.g. four) forward link transmission that includes a WF mux module 714 prior to a GBBF 412 and multi-beam array 411, all located in the ground hub 710. WF mux module 714 has four input signals, slices S1, S2, S3, and pilot code PS. WF mux module 714 has four outputs or wavefront components (wfc) y1, y2, y3, y4. These wfc signals are processed by a GBBF 412 that includes digital beam forming in 751, multiplexing (e.g. FDM) in 752, and frequency conversion and amplification in 753. The GBBF 412 processing is performed either in software where an analog to digital converter or digital to analog converter circuits may be present to convert digital signals to analog and/or vice versa. Alternatively GBBF 412 is performed in hardware with electronic circuits, integrated circuits, to perform the functions of beam forming, multiplexing etc. GBBF 412 generates WF MUX beam signals that are radiated by the antennas 411. The WF MUX beam signals are uploaded or uplinked to the UAVs 620-1 using the background link 450. The inputs to the four DBFs 751 are the wfc (y1, y2, y3, and y4) signals.

Continuing in the forward link embodiment of FIG. 7a, in the lower part of the drawing, the UAVs 620-1 transmit signals through the forward link 420 to the foreground area 130. In one embodiment, the terminal 633 in the foreground area 130 has a receiving multi-beam receiver 745 with antenna array elements 722. Each antenna array elements 722 is followed by a LNA and frequency down converter 721 to amplify and condition the received signals. The conditioned received signals are sent to a multi-beam beam forming network BFN 723 that forms multiple tracking beams based partly on the flight pattern dynamics of the relaying UAVs 620-1 and also on the information encoded in the beams. The outputs of the multi-beam BFN 723 are y1', y2', y3', and y4' that originated from signals of y1, y2, y2, and y4, respectively, but are now contaminated by noises and interference. The received signals y1', y2', y3', and y4' are sent to a baseband processor 724 comprising a bank of four adaptive equalizers 741 and a 4-to-4 WFdemux 742. The outputs of the WFdemux 742 comprise the recovered three slices of signal streams S1, S2, S3 and a stream of pilot codes PS. The recovered signals S1, S2, S3 may be designated for different end users in the foreground area 130; e.g., each stream constitutes a phone call.

In operation, the terminal 633 tracks signal beams from the multiple (e.g. four) UAVs 620-1, concurrently. Terminal 633 receives signals from four concurrent wireless links: link 420a to UAV M1a 620-1a, link 420b to UAV M1b 620-1b, and so on. WF muxing/demuxing compensates for the cumulative phase and amplitude imbalances among the four propagation paths and the associated electronics. The four paths are 450a plus 420a; 450b+420b; 450c+420c; and 450d+420d. The Ku/Ka band channels in the background links 450 have adequate instantaneous bandwidths to support all four M1 UAVs 620-1, concurrently. These techniques include employing advance multi-beam antennas in the ground hub 710 that provides orthogonal beams to the UAVs 620-1 to facilitate frequency reuse.

In one operational embodiment, the distance among the UAVs 620-1 is varied slowly so that the path lengths changes, a variation that is accounted for in performing coherent power combining. The relative geometries among the UAVs 620-1 is continuously calibrated and then compensated for in the forward link. The use of WF muxing/demuxing along with adaptive equalization dynamically compensates for differences in the amplitudes and phases among the four propagation paths, which enables continuously maintaining the coherency among the signals that are relayed by the four independent UAVs 620-1. This operational scenario allows the coherent addition of the stronger radiated signals from the multiple UAVs 620-1 to improve SNR and/or to overcome signal transmission obstructions.

Regardless whether there is variation among the UAV distances, the signals transponded by (uplinked then retransmitted) the four UAVs 620-1 are detected and amplified by the multi-beam receiver 745. The receiver 745 concurrently receives signals, y1', y2', y3', and y4' that are the transponded signals of y1, y2, y3, and y4 with possible additional noise and cumulative differences in phases and amplitudes due to the four UAVs 620-1, electronics, and/or atmospheric effects. The WFdemux 742, along with the finite-impulse-response (FIR) filters 741, equalizes the propagation paths of the forward link to compensate for phase imbalances and amplitude differences in any of the segments traversed, the uploading background segment, airborne segment, or foreground receiving segment. During equalization, the coefficients of the FIR filters 741 are optimized by an iterative control loop based on comparisons of the recovered pilot codes PS against the original PS codes that were transmitted. PS is a known diagnostic signal that traversed all of the bent pipe paths and the control loop and electronics and thus serves as an efficient optimization tool in the optimizer 724.

In one embodiment of the optimization control loop, the adaptive equalizers are implemented, for example, as finite-impulse-response (FIR) filters with adaptive filter coefficients that are adjusted by an iterative optimization loop using an optimization processor 743. As an example, the optimization loop is based on a cost minimization algorithm using steepest descent principles. Alternative methods to optimize the coeffceints include maximum likelihood or least squares fit. In one configuration, the optimization loop in the baseband processor 724 comprises signals traversing (1) adaptive equalizers 741, (2) a WF demux 742, (3) comparators or cost functions generating processor 744, and (4) an optimization processor 743 having outputs of the updated coefficients for the adaptive equalizers 741. The main or feed forward path comprises the adaptive equalizers 741 and the WF demux processor 742. The feedback path includes the comparators 744 and the optimization processor 743.

A total cost (an estimator of the best solution for the filter coefficients) is obtained through an iterative optimization loop. A known pilot signal PS was originally transmitted by the ground hub 710. The known pilot signal PS underwent the WF MUX processing procedure in ground hub 710 and is now to be recovered in the user terminal 633. The recovered PS value is compared to the original, known PS value, as a diagnostic tool to evaluate the total cost and produce the best filter coefficients. The "best" filter coefficients comprise the solution where the recovered PS value and the original PS value matches closely. The coefficients are dynamically calculated by comparing at 744 the recovered pilot codes with the known PS sequences. The comparison is characterized by a "cost function" or measurable that is assigned to the diagnostic observable pilot codes. The cost function serves the purpose of a Chi-square test or maximum likelihood function in statistics and probability analyses. The cost function is a positive valued number that changes and the value indicates whether an optimal solution for the coefficients has been reached in an iterative process. The total cost is the sum of all cost functions and comprises a non-zero positive number, representing current status of optimization loop. When the total cost value is large, the adaptive equalizers are far from a desired (or optimal) performance. On the other hand, smaller values indicate that the adaptive equalizers are reaching an optimal state. At a fully optimized state when the total cost value is substantially zero, the outputs of the WFdemux 742 are taken to be the recovered input signals S1, S2, S3, and PS. As such, the pilot code PS signal is a diagnostic signal stream that aids the reconstruction of the user transmitted signals S1, S2, S3. Because the S1, S2, S3, PS signals are recovered at the terminal 633, the same notation is used for the signals at the outputs of the WFdemux module 742, as at the inputs of the WFmux 712, in FIG. 7a.

In another embodiment, the cost minimization includes identifying multiple relevant variables or observables to provide to the processor 743. The relevant observables include the difference between the recovered pilot signal stream S4 and the original PS. The relevant observables also include the correlations of the signals S1, S2, S3, S4 at the output of the WFdemux 742. Then (point A), different cost functions are generated based on the various the observables, which includes converting or mapping the observables into different measurable variables or cost functions. When an observable meets the desired performance, the corresponding measurable or cost function moves towards zero. When an observable is slightly away from the desired performance, the corresponding measurable or cost function is assigned a small positive number. When an observable is far away from the desired performance, the corresponding measurable or cost function is assigned with a large positive number. The sum of all cost functions yields a total cost value that defines a numerical indicator of the current status of the optimization loop performance. If the total cost value is less than some small positive threshold value, then the optimization loop is stopped and the coefficients existing in that iteration of the loop become the "best" coefficients. Otherwise, the iteration continues, and the derivative or gradient of the total cost with respect to each coefficient (of the FIR filter 741) is calculated. New coefficients are calculated iteratively based on a steepest descent algorithm to minimize the total cost value during the optimization loop. Upon each iteration of the loop, the coefficients are updated, and then the loop returns to point A. Thus in this embodiment, the total cost value converges toward zero, but does not have to become zero for an optimal solution to be obtained.

In different embodiments, WFdemux 742 is implemented using a FFT fast-Fourier transform or DFT (Discrete Fourier transforms), a Hadamard matrix in a digital format, or combinations of a FFT and Hadamard matrices. Alternatively a WFmux 712 or WFdemux 742 is constructed using a Butler Matrix (BM) made with analog circuits having passive components. In FIG. 7a, a 4-to-4 WFmux 712 and a 4-to-4 WFdemux 742 are implemented, although a number of channels other than four may be selected also.

One way to implement WF MUX technology can be described mathematically at each stage of the electronics. For instance, the outputs y1, y2, y3, and y4 of the WFmux 712 are the weighted sums of the inputs S1, S2, S3, and PS:

$$y1(t)=w11*s1(t)+w12*s2(t)+w13*s3(t)+w14*ps(t) \quad (1.1)$$

$$y2(t)=w21*s1(t)+w22*s2(t)+w23*s3(t)+w24*ps(t) \quad (1.2)$$

$$y3(t)=w31*s1(t)+w32*s2(t)+w33*s3(t)+w34*ps(t) \quad (1.3)$$

$$y4(t)=w41*s1(t)+w42*s2(t)+w43*s3(t)+w44*ps(t) \quad (1.4)$$

where, $s1(t)=S1$, $s2(t)=S2$, $s3(t)=S3$, and $ps(t)=PS$; and "t" is the time or digital sample index; and the coefficients w11, w12, etc., are fixed-valued weights. Thus, S1 appears in all of the outputs y1, y2, y3, and y4. Similarly for the other inputs S2, S3, and PS, each appears in every one of the four outputs.

A wavefront vector (WFV) having four components is a column matrix whose elements are the weight coefficients:

$$WFV1=WF1=\text{Transpose of } [w11,w21,w31,w41] \quad (2.1)$$

$$WFV2=WF2=\text{Transpose of } [w12,w22,w32,w42] \quad (2.2)$$

$$WFV3=WF3=\text{Transpose of } [w13,w23,w33,w43] \quad (2.3)$$

$$WFV4=WF4=\text{Transpose of } [w14,w24,w34,w44] \quad (2.4)$$

where WFX*WFY=1 if X=Y, otherwise WFX*WFY=0; where X and Y are integers from 1 to 4. Thus, the four WFV vectors (column matrixes) are set up mutually orthogonal by choice. WF1 is associated with signal stream S1, WF2 with S2, WF3 with S3 and WF4 with PS.

Similarly, the outputs of the WFdemux 742, s1, s2, s3, and s4 are weighted sums of the inputs y1', y2', y3', and y4':

$$s1'(t)=w11'*y1'(t)+w21'*y2'(t)+w31'*y3'(t)+w41'*y4'(t) \quad (1.5)$$

$$s2'(t)=w12'*y1'(t)+w22'*y2'(t)+w32'*y3'(t)+w42'*y4'(t) \quad (1.6)$$

$$s3'(t)=w13'*y1'(t)+w23'*y2'(t)+w33'*y3'(t)+w43'*y4'(t) \quad (1.7)$$

$$s4'(t)=w14'*y1'(t)+w24'*y2'(t)+w34'*y3'(t)+w44'*y4'(t) \quad (1.8)$$

where, $s1'(t)=S1$, $s2'(t)=S2$, $s3'(t)=S3$, and $s4'(t)=S4=PS$; and "t" is the time or digital sample index; and the coefficients w11', w12', etc., are fixed weights. Thus, y1' appears in all of the outputs S1, S2, S3, and S4. Similarly for the other inputs y2', y3', and y4', each appears in every one of the four outputs. Moreover, the weights w11', w12', etc., are usually adjusted upon each iteration of the optimization control loop. And, the notation S1, S2, S3, S4 is reused because after the error correction and optimization is performed, the outputs of the WFdemux 742 should be substantially similar to the inputs for the WFmux 712.

In addition at a user terminal 633, $$y1'=[a1*\exp(j\Phi a)]*y1=a1*\exp(jk*z1+p1)*y1 \quad (1.10)$$

$$y2'=[a2*\exp(j\Phi b)]*y2=a2*\exp(jk*z2+p2)*y2 \quad (1.11)$$

$$y3'=[a3*\exp(j\Phi c)]*y3=a3*\exp(jk*z3+p3)*y3 \quad (1.12)$$

$$y4'=[a4*\exp(j\Phi d)]*y4=a4*\exp(jk*z4+p4)*y1 \quad (1.13)$$

where "j" designates the imaginary part of a number, and $\Phi a$, $\Phi b$, $\Phi c$, and $\Phi d$ are the cumulative phases incurred as a signal goes through different electronics and various segments of the bent pipe propagation paths. And, "k" is the wave number index and equals to $2\pi/\lambda$, where $\lambda$ is the wavelength associated with the signal frequency. Further, z1 is sum of path lengths 450a and 420a for UAV 620-1a, a1 and p1 are amplitude and phase imbalances associated with the electronics or obstacles along the path; z2 is sum of path lengths 450b and 420b for UAV 620-1b, a2 and p2 are amplitude and phase imbalances; z3 is sum of path lengths 450c and 420c for UAV 620-1c, a3 and p3 are amplitude and phase imbalances; and z4 is sum of path lengths 450d and 420d for UAV 620-1d, a4 and p4 are amplitude and phase imbalances. When z1=z2=z3=z4=0, p1=p2=p3=p4=0, and a1=a2=a3=a4=1; then; s1'(t)=c*s1(t), s2'(t)=c*s2(t), s3'(t)=c*s3(t), and s4'(t)=c*s4(t), where c is a constant.

Furthermore, Equation (1.5) to (1.8) can be written as $$s1'(t)=w'11*y1(t)+w'21*y2(t)+w'31*y3(t)+w'41*y4(t) \quad (1.5a)$$

$$s2'(t)=w'12*y1(t)+w'22*y2(t)+w'32*y3(t)+w'42*y4(t) \quad (1.6a)$$

$$s3'(t)=w'13*y1(t)+w'23*y2(t)+w'33*y3(t)+w'43*y4(t) \quad (1.7a)$$

$$s4'(t)=w'14*y1(t)+w'24*y2(t)+w'34*y3(t)+w'44*y4(t) \quad (1.8a)$$

where $$w'11=[a1*\exp(j\Phi a)]*w11 \quad (1.9a)$$

$$w'21=[a2*\exp(j\Phi b)]*w21 \quad (1.9b)$$

$$w'31=[a3*\exp(j\Phi c)]*w31 \quad (1.9c)$$

$$w'41=[a4*\exp(j\Phi d)]*w41 \quad (1.9d)$$

The wavefronts associated with S1, S2, S3, PS may suffer some distortion while traversing through the electronics and atmosphere. As a result, the wavefront vectors associated with the various data streams become mutually non-orthogonal, and there may be cross talk or signal leakages among the output channels in the reconstructed signals.

$$S1'=c*S1+\Delta 21(S2)+\Delta 31(S3)+\Delta 41(PS) \quad (1.10a)$$

$$S2'=c*S2+\Delta 12(S1)+\Delta 32(S3)+\Delta 42(PS) \quad (1.10b)$$

$$S3'=c*S3+\Delta 13(S1)+\Delta 23(S3)+\Delta 43(PS) \quad (1.10c)$$

$$S4'=c*PS+\Delta 14(S1)+\Delta 24(S2)+\Delta 34(S3) \quad (1.10d)$$

Where the notation "Δ21" refers to leakage coefficient from the second channel to the first channel; "Δ31" refers to the leakage coefficient from the third channel to the first channel, and so on. After equalization, the wavefront vectors become substantially mutually orthogonal, so that there is substantially no cross talk or signal leakage in the reconstructed signals.

In an application, in the ground hub 710 in FIG. 7a, the four wfc outputs y1, y2, y3, and y4 from the WF mux 712 are processed by the GBBF 412. Using an array with M elements on board each of the four UAVs 620-1, as an example, each of the four DBF processors 751 comprises M beam-formed element signal outputs. Each of the four FDM 752 performs multiplexing on M outputs, generating a single signal stream that is frequency up converted and power amplified by a RF frontend 753 before being transmitted by one of the four antennas 411 to a designated UAV 620-1. The antennas 411 have high gain and operate in the Ka/Ku frequency band, for example. There are also Ka/Ku antennas 236 on each UAV 620-1 to receive the uplinked signals. By arbitrary designation, the UAVs 620-1 relay the signals so that y1 is delivered to the user terminal 633 via the first UAV 620-1a, y2 via the second UAV620-1b, y3 via the third UAV 620-1c, and y4 via the fourth UAV 620-1d. Because each wavefront component wfc y1, y2, y3, y4 is a weighted sum of the inputs, S1 is relayed concurrently to the designated user terminal 633 by four separate UAVs 620-1 through a common frequency slot. Similarly, S2 is relayed to a second user by four separate UAVs 620-1 through the common frequency slot. The second user is collocated with the same beam region 1302 as that of the first user. Similarly, S3 is relayed to a third user in region 1302. In this embodiment, each UAV 620-1 also power amplifies the transponded signals it receives before re-radiating the signals to the three designated terminals 633 respectively; a first one for reception of S1, a second one for reception of S2, and a third one for reception of S3.

In this example, each of the three users in the same beam region 1302 concurrently receive his own signals transmitted in the same frequency slot through the same four propagation paths from a common ground hub 710. The three signals and a pilot signal are WF muxed with four mutually orthogonal WF vectors in a 4-D space, where each dimension of the 4-D space is a propagation channel of a WF vector. Thus the four components of all four WF vector are concurrently sent through four different paths; each component of all four WF vectors are aggregated and sent through a UAV 620-1. At the destination where the terminals 633 are located, the cumulative phase and amplitude differences among the components of a WF vector are removed through adaptive equalization and WF demuxing. The outputs of each WF demux for each terminal 633 become the recovered input signals (S1, S2, S3), if the cumulative phase and amplitude differences are substantially fully equalized.

Turning now to an embodiment of the return link for the bent pipe communication configuration, FIG. 7b depicts an example of the operational principles of coherent power combining and WF MUX in the other direction. In the foreground area 130, a user has a terminal 633 that is equipped to transmit WF MUX signals via antennas 722. Terminal 633 comprises a TX modulator 765 that generates a stream of modulated signals, S1, and a stream of diagnostic codes, pilot codes PS. 51 and PS are sent as inputs to a 4-to-4 WFMux 764. Other inputs of WFMux 764 remain grounded or disconnected. Alternatively, if there are other nearby users in the same spot beam region 1302 wishing to send communications or data, they may also provide inputs S2 and S3 to the WFMux 763. The S2 and S3 signals may also be modulated by modulator 765.

Each signal stream S1, S2, S3, PS is part of and maps to a unique WF vector at the output of the WFMux 764. The wavefront (WF) vectors in the four outputs of the WFMux 764, y1, y2, y3, y4 are mutually orthogonal to one another by construction if they were generated by a WFMux 764. Each user signals stream is associated with one WF vector; S1 with WF1, S2 with WF2, S3 with WF3, and PS with WF4. Orthogonal signals simplify reconstruction and there is less or no cross talk and leakage of one signal to another. The four parallel outputs y1, y2, y3, and y4 are sent to a transmitting multi-beam beam forming network BFN 763 that forms multiple tracking beams, following the movement of the relay air vehicles or UAVs 620-1. The outputs y1, y2, y3, and y4 of BFN 763 are conditioned, frequency up-converted and power amplified before being radiated by antenna array elements 722. Each of the four transmitted beam signals is sent to one UAV 620-1; for example, y1 is transmitted to UAV 620-1a, y2 to UAV620-1b, y3 to UAV620-1c, and y4 to UAV620-1d. As a result, the S1 signal stream is actually propagating in the four UAV paths in parallel, concurrently with a unique distribution pattern. For instance, S1 is duplicated and weighted by WF vector 1 or WF 1 in the four parallel paths. So are the S2, S3 and PS signal streams weighted by different distribution patterns. For terminals 633, the signals S1, S2, S3, PS are transmitted in the C-band, but the techniques also work for signals of the L/S band or some other frequency band.

The foreground area 130 signals are detected and amplified by a receiving (Rx) antenna array (e.g. 217a) with N elements on each of the four UAVs 620-1. On each UAV 620-1, the signals are also FDM multiplexed individually, amplified, and frequency converted to the Ku/Ka or some other frequency band. Each of the four UAVs 620-1 then transmits the signals through one of the background links 450 to one of the four directional antennas 411, as depicted in FIG. 7*b*. The signals from each UAV 620-1 are transmitted to a particular antenna 411. Each antenna 411 inputs to one channel of the GBBF 422, where the GBBF 422 conditions the signals (e.g. amplifier, filter), down converts (783) the frequency of the signals, and FDM demultiplexer (782) the signals, before sending each one of the signals to a corresponding one multi-beam receiving DBF 781. The outputs y1', y2', y3', and y4' from each of the four DBFs 781 are input to an optimizer 724. In one embodiment, the optimizer 724 in the return link is similar to the optimizer 724 in the forward link, which was described earlier with respect to FIG. 7*a*. The return link optimizer 724 recovers the signals S1 and PS (and S2 and S3 if there were such signals sent from the terminal 633) in a manner similar to that in the forward link. However, the return link optimizer 724 is located in the ground hub 710 instead of being in a terminal 633. Moreover, the S1 (and any S2, S3) signals in the ground hub 710 may be in a different frequency band than those of the slices S1, S2, S3 in the terminal 633, but the symbols or message is substantially the same except for any small error compensation differences. But in this embodiment, both the WF multiplexing and the WF demultiplexing are both performed on the ground, albeit in different ground areas.

In another embodiment, the four individual antennas 411 may be replaced by one multi-beam antenna with four beam receivers independently tracking different UAVs 620-1 concurrently. But regardless of the antenna configuration, the return link optimizer 724 comprises an adaptive equalizing FIR filter 741. Individual adaptive filters 741 compensate for amplitude and phase differentials caused by differences among the different propagation paths. Differences among the four FIR filters 741 are compensated for as a group to correct for time and phase differences. The coefficients of the return link FIR 741 are again optimized by an iterative control loop through the use of the diagnostic, known pilot signal PS. The outputs of the return link FIR 741 go to the WFdemux 742 that recovers the slices S1, S2, S3 by performing the inverse of the equations 1.1 through 1.4 (or performing calculations of 1.5a to 1.8a) to extract s1(t), s2(t), s3 (t) and s4(t) at time index t. In the calculations, the weights w'11, w'12, etc., are initially, the best guess values that are obtained from the optimization process in the return link optimizer 724 (having the iterative control loop to obtain the best coefficients for the FIR filter 741). Thus, this return link is an example of using coherent power combining from radiations transmitted by relay air vehicles that are flying at a large distance apart. The power radiated by the UAVs 620-1 is coherently combined (added together through the WFdemux 742 with adaptive equalizers 741), after the adaptive equalization loop converges. Otherwise, the output signal at the first output port (slice1) of the WFdemux 742 will produce a S1 signal at lower intensity (e.g. 6 dB less) with signal leakages coming from S2, S3, and PS in addition to any electronic receiver noises. The combining process is performed in 724 that comprises a baseband processor 724, rather than in free space as is the case with spatial power combining process.

Beam Forming

Figure 8:
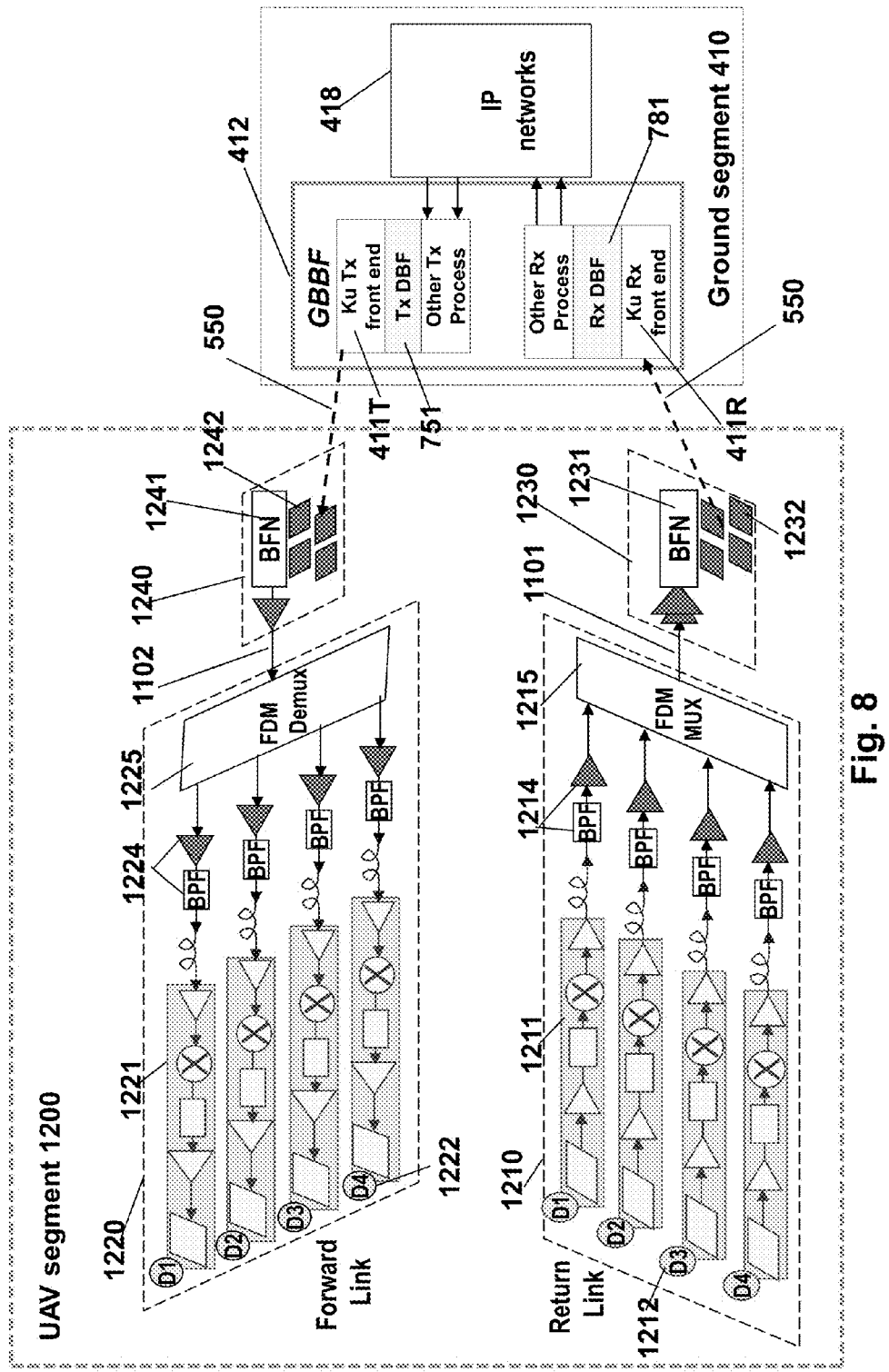
FIG. 8 depicts a block diagram of communications electronics on an airborne vehicle in communication with a ground based beam forming facility (GBBF).

Turning now to more details in the beam forming electronics and software mentioned in the various foregoing embodiments, FIG. 8 depicts a block diagram of communications electronics 1200 ("UAV segment 1200") on airborne vehicles or UAVs 120 that are in communication with a ground based beam forming facility GBBF 412 in a ground segment 410. The GBBF 412 is located in the background area 132 and utilizes digital beam forming techniques and GBBF 412 is wirelessly coupled to the UAVs 120 through a background link such as 380 or 550.

In the embodiment of FIG. 8, the UAV segment 1200 comprises four functional blocks. There is a forward link transmitting circuit FwdTX 1220 that operates, for example, in the L/S frequency band for communications with the foreground area 130. FwdTX 1220 electrically couples to a forward link receiving circuit FwdRX 1240 that operates, for example in the Ku/Ka frequency band for communications via the background link 550. In the return link direction, there is a transmitting circuit RetTX 1230 that operates, for example in the Ku/Ka frequency band. The RetTX 1230 electrically couples to a receiving circuit RetRX 1210 operating for example in the L/S band frequency band with the foreground area 130. Both circuits, FwdRX 1240 and RetTX 1230 communicate with a background hub such as 410 or 710.

The FwdRX 1240 comprises a Ku/Ka band compatible receiving antenna array 1242 with, for example, an array with four panels for background-link 450 communications. The four panel array 1242 is software/command-controlled to point its receive beam direction toward the ground segment 410 via a Ku/Ka frequency compatible beam forming network BFN 1241 that is implemented using a 4-to-4 Butler matrix followed by a 4-to-1 switch or something functionally equivalent.

The RetTX 1230 comprises a Ku/Ka frequency compatible transmitting antenna array 1232 with, for example, four panels for background-link communications. The four panels array 1232 is software/command-controlled to point its transmit beam direction toward the ground segment 410 via a Ku/Ka frequency compatible beam forming network BFN 1231 that may also be implemented by a 4-to-1 switch followed by a 4-to-4 Butler matrix or something functionally equivalent.

The receive FwdRX 1240 and transmit RetTX 1230 comprise mostly analog circuits with a BFN 1231 or 1241 made of dielectric material or microstrip layout on a printed circuit board so that the electronics is small. Moreover, one advantage of an on-board BFN 1231 or 1241 is that it reduces the bandwidth needed to accommodate the background link 450 or 550 communications. The on-board BFN 1231 also has an improved antenna gain, which reduces the required radiation power, and allows communications with ground hubs farther away and/or enhances the channel capacity.

In the return link direction in FIG. 8, the signals flow from the foreground 130 to the UAV segment 1200 comprising RetTX 1210, and eventually to the ground segment 410. RetRX 1210 comprises four receive elements or channels D1, D2, D3, and D4 1212, each of which is electrically connected to a LNA, a (band-pass filter) BPF, and an up-converter 1211 to the Ku/Ka band. The four received signals, up-converted from the four Rx subarrays are FDM multiplexed 1215 into a single stream 1101 that is transmitted to a ground segment 410 via a 4-element Ku/Ka array 1232. Controlling the array 1232 is a Ku/Ka Tx beam forming network (BFN) 1231 that comprises a Butler matrix (TxBM). Each of the four outputs of the TxBM is electrically connected to an active array element of 1232.

In operation in the return link direction, on the UAV 120, signals captured by array elements or channels D1, D2, D3, and D4 1212 are conditioned by LNAs, band-pass-filters (BPF) and frequency up-converted to a common IF by four individual L/S band frontends 1211. After further conditioning by BPF and buffer amplifiers 1214, the conditioned received element signals are then FDM multiplexed by a FDM multiplexer 1215, combined into a multiplexed single stream of signals 1101 that are delivered to the Ku/Ka RetTX 1230 of the background communications. The signals 1101 are power amplified before being sent to a Tx BFN 1231 that adds the proper phases and amplitude modifications for radiation by the individual panel elements 1232. The radiated signals are coherently combined in the ground segment 410.

In the ground segment 410, the radiated element signals 1101 captured by ground segment antennas (not shown) are conditioned by a low noise amplifier, filtered and then frequency down converted by a Ku/Ka Rx (receive) front end 411R in the GBBF 412. Such conditioned signals are then sent to a multi-beam Rx digital beam forming (Rx DBF) 781 that converts the conditioned radiating element signals 1101 to beam signals. These recovered beam signals then go through receiving functions including demodulation, and so on, before going to a terrestrial IP network 418 such as a phone or Internet.

In the forward link direction in FIG. 8, the signals flow from the ground segment 410 to the UAV segment 1200 comprising FwdTX 1220, and eventually to the foreground 130. In-coming data and information traffic from terrestrial IP network 418 go through various transmit functions including the modulation, and encoding in the GBBF 412. The modulated beam signals are sent through a multi-beam Tx digital beam forming module TxDBF 751 that converts beam signals into radiating element signals that are multiplexed into a single stream before frequency up conversion (e.g. baseband to Ku/Ka band) and power amplified in the transmit frontend 411T of the ground segment 410. Then the multiplexed element signals are radiated by Ku/Ka transmitting antennas (not shown) located in the ground segment 410. On the UAV 120, the multiplexed element signals 1102 are received by the array 1242, the element signals that were processed and encoded by the GBBF 412 and designated for transmission to a particular foreground area 130 user. The uplinked or uploaded signals 1102 are FDM de-multiplexed in DMUX 1225, amplified and filtered at 1224 and frequency down-converted at 1221, amplified by individual power amplifiers, and then radiated by corresponding array elements or channels D1, D2, D3, and D4 1222. The radiated signals will be coherently combined in the foreground area 130, individually and concurrently in different desired directions corresponding to various targeted beam regions (e.g. 1302).

Figure 8A:
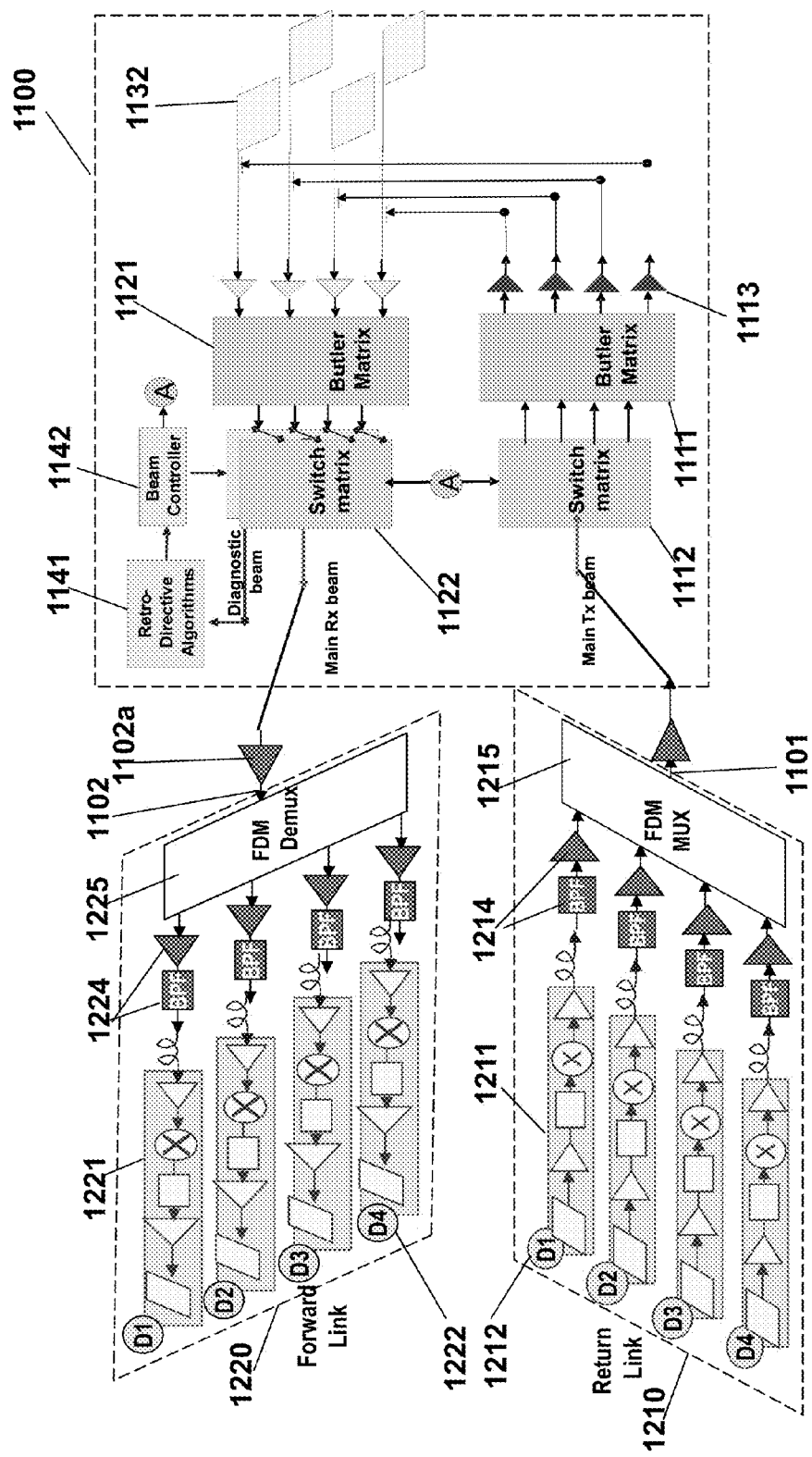
FIG. 8a depicts another block diagram of communications electronics and retro-directive antennas on an airborne vehicle in communication with a GBBF.

FIG. 8a depicts another embodiment of the on-board circuits and electronics on a UAV 120. The four panel arrays 1232, 1242 that are software/command-controlled in FIG. 8, are replaced by an analog retro-directive antenna circuit 1100 in FIG. 8a. Further, in the embodiment of FIG. 8, the forward link communication with users in the foreground area 130 is selected based mostly on user devices operating in the L/S frequency bands (e.g. cell phones). In the embodiment of FIG. 8a, the forward link communication with users in the foreground area 130 is selected based mostly on user devices operating at 700 MHz or 4.9 GHz, which are the emergency frequency bands in the U.S. The frequencies may also be interchanged in the two examples, or be replaced by some other value by using programmable electronics, for example, to reset the frequencies.

In FIG. 8a, in the forward link direction, the FwdTX 1220 transmits at the public safety frequency bands for foreground area 130 communications, but in the return link direction, the RetRX 1210 receives also in, for example, the safety frequency band for foreground 130 communications. However, in either the forward link or return link direction with respect to the background link 380 or 550, the communication frequency is the Ku/Ka frequency band, for example.

In FIG. 8a, the retro-directive antenna RDA 1100 transmits and receives in the Ku/Ka frequency band for the background area 132 communications. RDA 1100 comprises multiple (e.g. four) antenna array elements 1132 that have a low-profile and near conformal design. Each of the four antenna arrays elements 1132 may be set to point in a different direction (position) in space and receive or transmit signals in that direction. These arrays elements 1132 may be considered a subarray, each pointing to a direction. However, it is also possible to set up the array elements 1132 so that they are aligned and pointed to a boresight of the entire RDA 1100 that has a large field of view of about 120 degrees. In RDA 1100, the receive multi-beam forming processing is performed by a 2-dimensional Butler matrix BM 1121 that is followed by a pair of switching matrices ST 1122 (one depicted behind the other in FIG. 8a). In one implementation embodiment, the BM 1121 comprises a 2-by-2 to 2-by-2 Butler matrix and a switch ST 1122 4-to-1 matrix. In the forward link, the first ST 1122 operates in the main signal path that is electrically coupled to the interface 1102 via a buffer amplifier 1102a. The first ST 1122 is controlled by a beam controller 1142 that decides which beam among the four outputs of the BM 1121 to select. The four outputs correspond to four separate beam positions (four directions covered by one of the four array elements 1132) that constitute the entire field of view of the RDA 1100. For example, if the four beam positions (four panels of 1132) using the notation of [elevation, azimuth] in an UAV 120 coordinate system are set at [30°, 30°], [30°, −30°], [−30°, 30°], and [−30°, −30°]. Each array element panel 1132 is associated with a beam position having a 3 dB beam-width (cone diameter) covering about 30 degrees. If there are multiple GBBF facilities 412, each array element panel 1132 might be pointing to a different facility 412. As the UAV 120 moves and/or its orientation changes, the relative position and direction of a desired GBBF facility 412 is also altered in the UAV 120 coordinate system, but the position and direction of a GBBF facility 412 should be within at least one of the four possible beam positions covered by the element panels 1132. The UAV 120 points its main beam position to the selected GBBF facility 412 via a second ST 1122 that can switch signals to a retro-directive analysis block 1141 to help determine the currently-best beam position to select based on the strength of the signals received.

The selection of the currently-best beam from among the four is made based on information derived from the second of the two switch matrices ST 1122 that is also controlled by the beam controller 1142. The second ST 1122 is continuously switched among all of the four possible beam positions and the second ST 1122 uses short dwell times (on the order of milliseconds) that are long enough to detect/sample the signal characteristics. The signal characteristics data collected by the second ST 1122 is used by an on-board processor (analysis block 1141), to identify a beam position that is currently associated with the strongest signal level, and having other characteristics associated with desired signals such as the frequency format and encoding (e.g. FSK or QAM), acquisition sequences, or unique header or trailing sequences in the information packages. The beam controller 1142 then informs both the transmit switch ST 1112 and the other receive ST 1122 (first of the two Rx ST 1122) which is the currently-best beam position choice for the retro-directive antenna RDA 1100.

In the return link direction, the receiving circuit RetRX 1210 receives from the foreground 130 (e.g. rescuers), the radiated element signals in a public safety band frequency (e.g. 700 MHz or 4.9 GHz). The RetRX 1210 frequency up-converts and the FDM 1215 multiplexes the element signals to produce signals 1101 and delivers them to the RDA 1100. The signals 1101 traverses a switch (e.g. 4-to-1) ST 1112 and a BM 1111. BM 1111 adjusts the phase and amplitude of the signals 1101. BM 1111 generates four properly-phased outputs that are amplified by power amplifiers 1113 and then radiated by the low profile antenna array elements 1132. When the four radiated signals reach the ground segment 410, the four radiated signals are spatially and coherently combined.

In more detail in the return link, there are multiple (e.g. four) receive channels D1, D2, D3, and D4 1212 that receives four input signals from the foreground 130. Each of the D1, D2, D3, and D4 channels have a frequency up-converter 1211 that converts the signal to a desired frequency band, such as the Ku/Ka band. The frequency up-converter 1211 is electrically connected to a low noise amplifier LNA and a band pass filter BFP 1214. The frequency converted four signals are FDM multiplexed at 1215 into a single stream element signal 1101, which is then power amplified at 1101a, then sent to the four-element retro-directive array RDA 1100. The element signal 1101 is sent to a switch matrix 1112 that is controlled by beam controller 1122 to select the appropriate inputs for the BM 1111 (the switch matrix 1112 is a 1-to-4 switch to channel the signal 1101 to the appropriate input of BM 1111). The four inputs of BM 1111 correspond to four separated beam positions, the four outputs of the BM 1111 are connected to the four antenna array elements 1132, respectively. The BM 1111 comprises a beam forming device for four concurrent beams that support four beam positions.

As an operational example, signal A connected to a first input of the BM 1111 yields four concurrent outputs of signal A with a first phase distribution (e.g. −90°, −135°, −180°, −225°). The four concurrent outputs of signal A appears in the four output ports of the BM 1111. Alternatively, when the signal A is connected to a second input port, this may yield four concurrent outputs of signal A with a different phase distribution (e.g. 225°, 90°, −45°, −180°) that appears in the four output ports of the BM 1111. The different phase distributions among the four output ports corresponds to different beam positions for an RDA 1100 having a fixed geometry in the UAV 120 coordinate system.

Figure 8B:
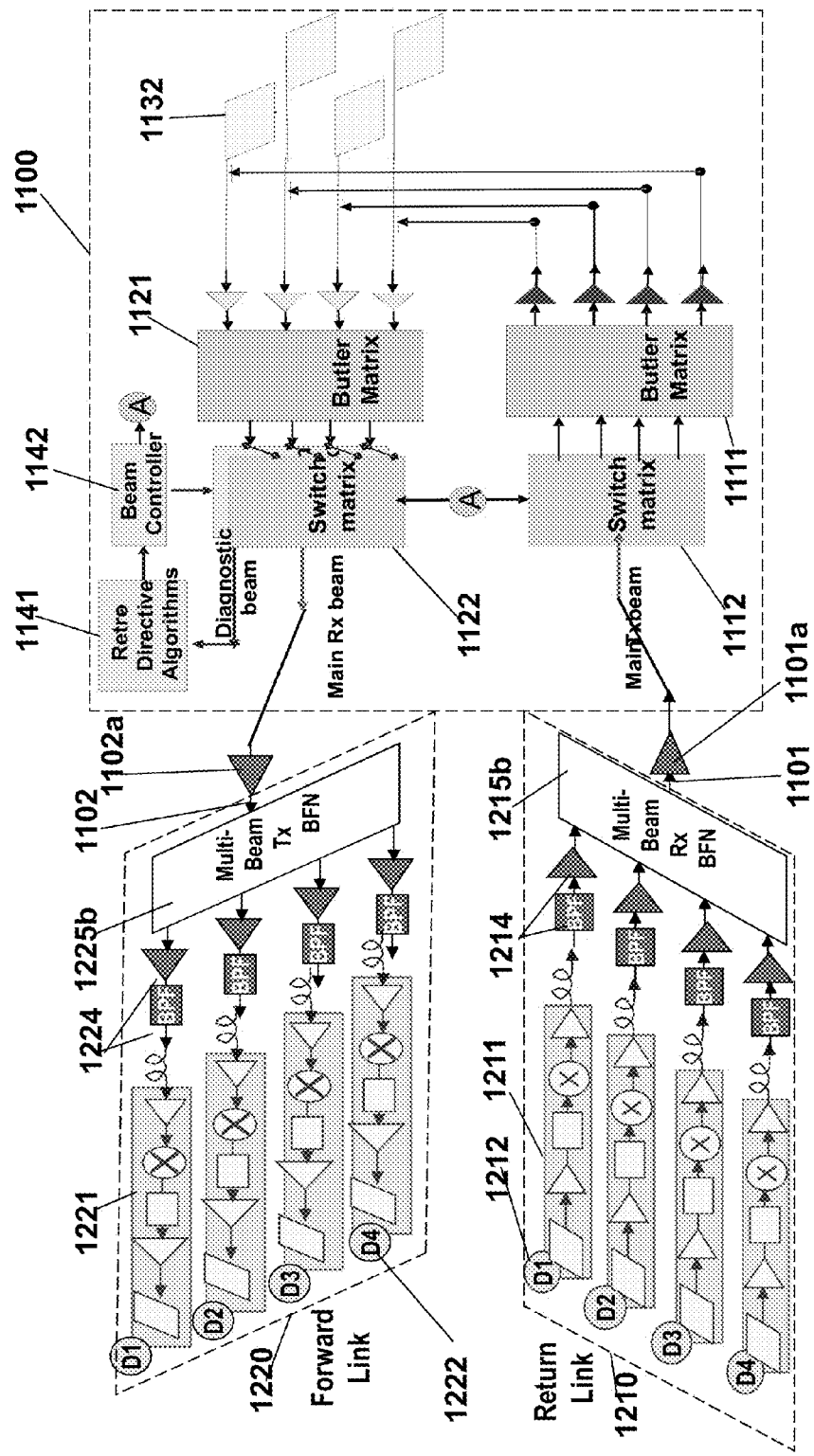
FIG. 8b depicts another block diagram of communications electronics on an airborne vehicle with a beam forming network and retro-directive antennas.

In another UAV 120 electronics embodiment having a retro-directive antenna RDA 1100, in FIG. 8b, instead of utilizing a GBBF facility 412 in the background area 132, there are beam forming electronics on board the UAV 120 for the foreground 130 communications. One embodiment of this was already presented in reference to FIG. 2. Now, FIG. 8b depicts a more-detailed embodiment. In the forward link FwdTX 1220, an on-board multi-beam transmit beam forming network (BFN) 1225B replaces the FDM demultiplexer 1225 of FIG. 8a. FwdTX 1220 transmits communications to the foreground area 130 using a public safety frequency band, for example. BFN 1225B comprises mostly analog electronics, including a 1-to-4 power divider followed by four sets of phase shifters, or a 1-to-4 switching matrix followed by a 4-to-4 Butler matrix. Likewise, in the return link RetRX 1210, an on-board multi-beam receive beam forming network BFN 1215B replaces the FDM multiplexer 1215 of FIG. 8a. RetRX 1210 receives communications from the foreground area 130, also in the public safety frequency band, for example. One advantage of an on-board BFN 1215B or 1225B for the foreground communications is that it reduces the bandwidth needed to accommodate the background link 450 communications because less information is uplinked to the UAV 120. For example, the background link 550 (Ka/Ku) bandwidth may be reduced to less than the product of the total foreground link (L/S) bandwidth times the number of antenna array elements 1222 and 1212, when the number of concurrent beams is less than the number of antenna array elements 1222 and 1212 for foreground communications.

Finally, regardless of a particular embodiment or configuration of the airborne vehicles and electronics described above, two major technology features include remote beam forming and wavefront multiplexing. A remote beam forming network (RBFN), not located on an air vehicle, such as ground based beam forming (GBBF) may be implemented using digital electronics and software. Digital beam forming (DBF) includes remote use of PLAs or FPGAs or computers or other processors in a GBBF processing center located at a gateway facility. The GBBF processor performs beam forming for antenna arrays located on UAVs or air vehicles that act as airborne communications towers or relay stations. Even a single gateway can support multiple UAVs. There are also multiple frequencies involved, at least one for a communications network some frequency (e.g. emergency band) such as for rescue teams; another one for the community members in the disaster areas using, for example, existing cellular phone frequency bands or WiF.

Another technology is wavefront multiplexing/demultiplexing (WF MUX). It includes performing transformations having characteristics such as (1) orthogonality among WF vectors, and (2) redundancy and signals security. The first characteristic is beneficial for (a) calibrations on the background-link transmission for RBFN/GBBF, and (b) coherent power combining in the receivers for signals coming from different channels on various UAVs or other sources. The second characteristic is beneficial for (c) secured transmissions with redundancies via the UAVs.

Moreover some of the highlights include the following, in engineer notation: A concept of airborne communications network using remote beam forming on ground
  a. Communications architectures on an air platform
    i. S/L or C-band arrays on an air platform for foreground supporting multiple-beam communications; the beam forming mechanisms for the array are not on board but remotely on ground facility
    ii. Retro-directive arrays at X, Ku or Ka band on an air platform for background communications; the beam forming mechanisms are implemented using analogue techniques on board.
  b. GBBF processing with the Gateway;
    i. using digital implementations for multiple concurrent beams.
    ii. Interconnectivity within the network via a routing network in the gateway
    iii. Provide connectivity to other infrastructures
  c. Users at foreground communications networks
    i. Separated networks for rescue team and community in disaster areas
      1. supporting rescue teams using 4.9 GHz or other emergency bands
      2. support local community using commercial cell phone band 3. Intra-network communications via Gateway Interconnections.
d. Design example: sixteen element array; enable a four element subarray with multiple beam capability maintaining links for a data rate at 10 Mbps for each subarray; enable sparse array made from four subarrays at S/L or C bands with multiple beam capability; Ku band feeder links with a bandwidth of 160 MHz; cell phones for residents in serviced community; common rescue mission equipment operating at 4.9 GHz; in the foreground: three Ku band antennas to track three UAVs concurrently and individually at a data rate of 150 MHz in both uplink and downlink directions; and GBBF capability with knowledge of evolving array orientations on UAVs.

Fore-Ground Communications Networks
a. Multiple dynamic beams can be formed via the GBBF facility at the gateway; according to the traffic demands
  i. fixed contiguous spot beams
  ii. dynamic agile spot beams
  iii. combinations of i and ii
  iv. shaped contour beams Feeder Link (Background Link) Designs at Ku Band
b. Retro-array on board and gimbaled dish on ground for two-way communications with a 150 MHz instantaneous bandwidth each.
c. With 4, 8, or 16 element arrays with a diagnostic beam continuously scanning for the detections and updating of angle of arrivals radiated by the GBBF facility collocated with the gateway.
d. Using Butler matrix and two switching network; one for main traffic and the other for the diagnostic scanning beam.

Feeder Link Compensation Techniques Using Wavefront Multiplexing

Coherent Power combining in receiver using WF muxing/demuxing through UAV based wireless networks Coherent Power combining in receiver using WF muxing/demuxing through UAV based wireless networks for Bi-static radar receiver Coherent Power combining in receiver using WF muxing/demuxing through UAV based wireless networks for broadcasting or multicasting applications.

Compensations using WF muxing/demuxing for multiple UAVs. based wireless networks for broadcasting or multicasting applications.

Compensations for dynamic geometries of distributed arrays based on multi-UAVs using WF muxing/demuxing and multi-beam GNSS receivers on UAVs.

Finally, the orientation and directions stated and illustrated in this disclosure should not be taken as limiting. For example, the directions, e.g. "top," are merely illustrative and do not orient the embodiments absolutely. That is, a structure formed on its "side" or "bottom" is merely an arbitrary orientation in space that has no absolute direction. Also, in actual usage, for example, the equipment may well be on its "side" because the airborne vehicles fly, bank and rotate in many directions; and then, "top" is pointing to the "side." Thus, the stated directions in this application are arbitrary designations.

Also, the coverage area and distances and diameters in the foregoing embodiments are not limiting. If the UAVs 120 fly at high enough altitudes, they can communicate with the background networks and GBBFs that are far away, from 100 Km to 1000 Km away. On the other hand, if the UAVs 120 fly at low altitudes, the UAVs 120 can communicate with background networks and GBBFs that are closer by, from 0 Km to 100 Km away. As such, the distance between the foreground area 130 and background area 132 depends on various factors such as the altitude at which the UAVs 120 are flying.

While certain features of the implementations have been illustrated and described herein, modifications, substitutions, changes and equivalents will occur to those skilled in the art. It is, therefore, to be understood that the claims are intended to cover all such modifications and changes that fall within the scope of the embodiments. It should be understood that they have been presented by way of example only, not limitation, and various changes in form and details may be made. Any portion of the apparatus and/or methods described herein may be formed in any combination, except mutually exclusive combinations. The embodiments described herein can include various combinations and/or sub-combinations of the functions, components and/or features of the different embodiments described. For example, the number of airborne vehicles stated can be increased or decreased because it is also possible to divide the equipment among more or fewer aircrafts. Finally, although the Title and disclosure focus on aircrafts, the methods described also work for water or land vehicles if there is unobstructed communication or if a vehicle can be moved to a hilltop, for example.

What is claimed is:

1. An unmanned airborne vehicle comprising:
antenna array elements covering a foreground area; and
a beam forming network coupled to said antenna array elements, wherein said beam forming network is configured to concurrently shape multiple radiation patterns to direct a first signal to a first beam region in said foreground area and to direct a second signal to a second beam region in said foreground area, wherein said first beam region is different from said second beam region, wherein said first and second signals are configured to be concurrently radiated at a common frequency slot to said first and second beam regions respectively.

2. The unmanned airborne vehicle of claim 1 comprising a diplexer coupled to said beam forming network, wherein said diplexer is configured to switch one of multiple links to be coupled to said beam forming network.

3. The unmanned airborne vehicle of claim 1 further comprising an amplifier arranged upstream of said beam forming network and configured to amplify said first signal.

4. The unmanned airborne vehicle of claim 1 further comprising a frequency converter arranged upstream of said beam forming network and configured to down convert said first signal in frequency.

5. The unmanned airborne vehicle of claim 1, wherein said antenna array elements are in a planar array.

6. The unmanned airborne vehicle of claim 1 further comprising a frequency demultiplexer configured to separate said first and second signals by frequency.

7. The unmanned airborne vehicle of claim 1, wherein said antenna array elements are provided for a reflector antenna.

8. The unmanned airborne vehicle of claim 1, wherein said antenna array elements and said beam forming network are provided for a multi-beam antenna configured for a forward link from said unmanned airborne vehicle to said foreground area and for a return link from said foreground area to said unmanned airborne vehicle.

9. The unmanned airborne vehicle of claim 1 comprising an omnidirectional antenna configured to link to a ground hub away from said foreground area.

\* \* \* \* \*